United States Patent
Hui

(10) Patent No.: US 8,111,655 B2
(45) Date of Patent: Feb. 7, 2012

(54) SYSTEM AND METHOD OF BASE STATION PERFORMANCE ENHANCEMENT USING COORDINATED ANTENNA ARRAY

(75) Inventor: Yan Hui, San Diego, CA (US)

(73) Assignee: AirHop Communications, Inc., San Diego, CA (US)

( * ) Notice: Subject to any disclaimer, the term of this patent is extended or adjusted under 35 U.S.C. 154(b) by 653 days.

(21) Appl. No.: 12/209,942

(22) Filed: Sep. 12, 2008

(65) Prior Publication Data

US 2010/0054196 A1 Mar. 4, 2010

Related U.S. Application Data

(60) Provisional application No. 61/092,679, filed on Aug. 28, 2008.

(51) Int. Cl.
*H04W 16/00* (2009.01)
(52) U.S. Cl. .................................. 370/329; 370/252
(58) Field of Classification Search .................. 370/328, 370/329, 334, 337, 338, 344, 347, 252
See application file for complete search history.

(56) References Cited

U.S. PATENT DOCUMENTS

| | | | |
|---|---|---|---|
| 5,579,016 A | 11/1996 | Wolcott et al. | |
| 6,564,057 B1 * | 5/2003 | Chun et al. | 455/437 |
| 7,925,303 B2 * | 4/2011 | Tarokh et al. | 455/562.1 |
| 2002/0115474 A1 * | 8/2002 | Yoshino et al. | 455/562 |
| 2006/0286974 A1 * | 12/2006 | Gore et al. | 455/422.1 |
| 2007/0129111 A1 * | 6/2007 | Kim et al. | 455/562.1 |
| 2008/0043648 A1 * | 2/2008 | Buga et al. | 370/310 |
| 2008/0070565 A1 * | 3/2008 | Maeda | 455/424 |
| 2008/0075033 A1 | 3/2008 | Shattil | |
| 2008/0267063 A1 * | 10/2008 | Trigui et al. | 370/229 |
| 2009/0005121 A1 * | 1/2009 | Wong et al. | 455/562.1 |
| 2009/0067375 A1 * | 3/2009 | Wong et al. | 370/329 |
| 2009/0080549 A1 * | 3/2009 | Khan et al. | 375/260 |
| 2009/0247086 A1 * | 10/2009 | Lin et al. | 455/67.11 |
| 2009/0296663 A1 | 12/2009 | Wild | |

* cited by examiner

*Primary Examiner* — Brian Nguyen
(74) *Attorney, Agent, or Firm* — Van Pelt, Yi & James LLP

(57) ABSTRACT

In wireless system, a group of Basestations (BTSs) can be managed by a centralized network management identity or can be self-organized by communicating with each other via wireless air-interfaces or wired interfaces. One such example are Femtocell systems. When the BTSs are using the same frequency for transmitting and receiving with relatively large transmitting power and when they are closer to each other, performance of such a system and user throughput or QoS (Quality of Service) gets degraded due to the interference between the BTSs and among the users. Smart antenna technique can be used in a coordinated way among a group of BTSs, such as Femtocells, to avoid or reduce interference or manage how interference happens to achieve performance enhancement such as higher system throughput or better QoS to individual applications.

31 Claims, 19 Drawing Sheets

(e)

SYSTEM AND METHOD OF BASE STATION PERFORMANCE ENHANCEMENT USING COORDINATED ANTENNA ARRAY

RELATED APPLICATION

The present application claims the benefit of co-pending U.S. provisional patent application No. 61/092,679 filed Aug. 28, 2008, the contents of which are incorporated herein by reference in their entirety.

FIELD OF THE INVENTION

This invention pertains to wireless communications and to applying smart antenna techniques in a coordinated way among a group of base stations, such as Femtocells, to reduce interference or manage how interference happens.

BACKGROUND OF THE INVENTION AND RELATED ART

Antenna arrays provide an efficient way to transmit and receive signals to improve the capacity, data throughput and link range by overcoming undesired channel conditions. Unlike with a single antenna where the parameters are limited to bandwidth, direction and amplitude, the beam pattern for an antenna array can be created by a weight vector which essentially modifies either or both of amplitude and phase of the signal transmitted or received by the antenna. While applying weights can be done by hardware in the radio frequency (RF) domain, it is usually more efficient and practical to apply them in the digital domain.

There are different ways to realize an antenna array, which results in many different technologies, algorithms, classifications, and terminologies. For discussion purposes, we classify them into 2 categories: Multiple-Input-Multiple-Output (MIMO) and Beam forming.

Beam forming is a signal processing technique used in sensor arrays for directional signal transmission or reception. When transmitting, a beam former controls the phase and relative amplitude of the signal at each transmitter, in order to create a desired signal pattern. When receiving, information from different sensors is combined in such a way that the expected pattern of the radiation is recovered. The adjustment is usually done either in the analog domain or in the digital domain via the so-called antenna weight. In the digital domain, weight can be represented by an array of complex numbers. The spatial selectivity is achieved by using adaptive or fixed receive/transmit beam patterns. There are significant performance improvements, or gain, of a fixed beam former compared with an omni-directional antenna. However, it is the adaptive beam forming that has promised much bigger performance improvements in wireless systems. Adaptive beam forming systems usually require certain feedback of the channel information from the device at the other end of the communication system or estimates of the information in order to determine how to adjust the antenna weights.

MIMO is the use of multiple antennas at both the transmitter and receiver to improve communication performance. In MIMO systems, a transmitter sends multiple streams by multiple transmit antennas. The transmit streams go through a matrix channel which consists of multiple paths between multiple transmit antennas at the transmitter and multiple receive antennas at the receiver. Then, the receiver gets the received signal vectors by the multiple receive antennas and decodes the received signal vectors into the original information.

SISO (single-in-single-out), SIMO (single-in-multiple-out), and MISO (multiple-in-single-out) are the special case of MIMO. Also there are open-loop MIMO and closed-loop MIMO. One example of open-loop MISO is transmit diversity, for example, Space-Time Transmit Diversity (STTD) used in Universal Mobile Telecommunications Systems (UMTS) standard and cdma2000 standard. An example of open-loop SIMO is receiver diversity with MRC combining or switched receiver diversity. MIMO sometimes can be divided into three main categories, spatial multiplexing, transmit diversity or space-time coding, and pre-coding.

Pre-coding can be viewed as a generalized beam forming that can support single-layer or multi-layer transmission in MIMO systems. In the absence of scattering, beam forming results in a well-defined directional pattern, but in general, cellular conventional beams are not a good analogy. When the receiver has multiple antennas, the transmit beam forming cannot simultaneously maximize the signal level at all of the receive antennas and pre-coding is used.

A pre-coding scheme can be used in a MIMO system where the antenna configuration is pre-defined. In this case, a codebook that defines the weights can be derived based on the desired directional beam patterns. This type of pre-coding is very much overlapped with the adaptive beam forming based on estimation. In the detailed description, we do not distinguish this from adaptive beam forming based on estimation. Pre-coding can also be used in a MIMO system where the antenna configuration is not pre-determined. In that case, the codebook is derived based on criteria such as maximizing the signal level under certain channel conditions. Note that pre-coding requires knowledge of the channel state information (CSI) at the transmitter. Pre-coding has been used in 4G wireless standards such as Long Term Evolution (LTE).

Placement of the antenna in an antenna arrays is very important. For beam forming, the antenna spacing in a uniform linear array (ULA) should be around $\lambda/2$ while for MIMO, the preferable antenna interval is around $4\lambda$ to $10\lambda$. A uniform circular array (UCA) is another way to place the antenna. There are also other ways to place an antenna array, such as a 2-D array, etc.

There has been work on coordinated antenna arrays. However, the prior art usually addressed how an individual BTS uses the method to improve the communications with multiple terminals. For example, U.S. patent application 20080075033 described a beam-forming system comprising a cooperative array of wireless terminals coupled to at least one wireless wide area network and communicatively coupled to a wireless local area network configured to provide information exchanges between the wireless terminals. A cooperative beam-forming system uses an antenna array formed by a group of wireless terminals in order to provide antenna-array processing benefits (such as frequency reuse, interference rejection, array-processing gain, and antenna-switching diversity) to the individual wireless terminals. A network access operator facilitates network control functionality between the WWAN and the cooperative array of wireless terminals. This patent application does not address the issue of coordination of multiple base stations each employs a beam forming systems.

SUMMARY OF THE INVENTION

Certain embodiments as disclosed herein provide for applying smart antenna technique in a coordinate way among a group of BTSs, such as Femtocells, to avoid, reduce interference or manage how interference happens to achieve performance enhancement such as higher system throughput or better QoS to individual applications.

In one aspect a method of wireless base station performance enhancement using coordinated beam forming in a system of base stations having a plurality of wireless base stations having antenna systems capable of beam forming includes identifying neighboring base stations and determining characteristics of the neighboring base stations to be used to determine desired beam forming for two or more of the base station. The antenna system of two or more of the base stations are then configured based upon the determined characteristics to create a null beam directed toward a neighboring base station to reduce interference with that neighboring base station. In one embodiment, configuring the antenna system of one or more of the base stations to create a null beam further comprises creating a receive null beam.

Another aspect of the method includes measuring signals received from the neighboring base stations to determine the direction and distance of one or more of the neighboring base stations. Additionally the method can include coordinating transmission characteristics of two or more of the base stations.

In another aspect transmission characteristics are selected from the group comprising transmit power, time, frequency resources, time-frequency resources. Additionally, the method can include determining the characteristics of the system by a central authority. Alternatively, the determining characteristics of the system is coordinated amongst the base stations.

In a further aspect a method of wireless base station performance enhancement using coordinated beam forming in a wireless network having a plurality of wireless base stations having antenna systems capable of beam forming includes identifying neighboring base stations and configuring the antenna system of two or more of the base stations to create a beam pattern to reduce interference with that neighboring base station.

Additionally, the beam pattern can include using frequency division in areas of common coverage for the two or more base stations. Further, the beam pattern can include using time-frequency division in areas of common coverage for the two or more base stations In one aspect the antenna configurations are selected from a subset of configurations in a codebook of patterns to select patterns having stronger beam pattern in the direction of subscribers and weaker beam patterns in the direction of neighboring base stations.

A further aspect includes a base station for performance enhancement using coordinated beam forming in a system of base stations. The base station includes an air-interface transceiver system which provides wireless communications with associated subscribers and which performs beam forming and includes an antenna system capable of beam forming; a second receiver configured to perform measurements of signals transmitted by other base stations; and a control unit in communication with the subscriber air-interface system and the second receiver for sending instructions to the subscriber air-interface system for configuring the antenna system of the subscriber air-interface system based upon characteristics of one or more neighboring base stations to create a null beam directed toward a neighboring base station to reduce interference with that neighboring base station.

These and other aspects of the invention will be described below with reference to the accompanying drawings.

DETAILED DESCRIPTION

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention.

Figure 1:
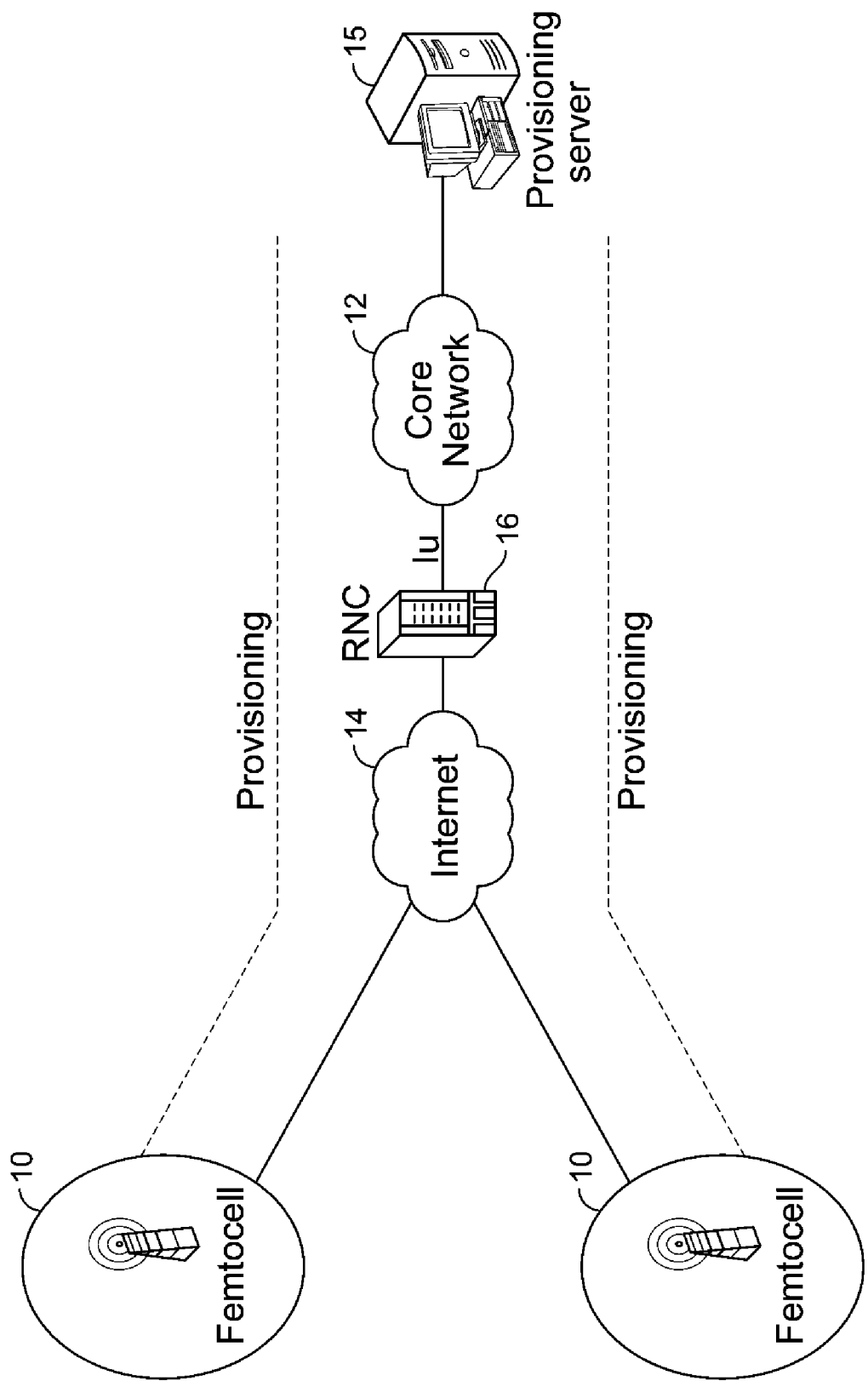
FIG. 1 shows a typical Femtocell system where the Femtocell BTSs are connected to the core networks through broadband connections. The provisioning of individual Femtocell BTS is done by the core network on per device basis.

In a wireless system, a group of base stations (BTSs) can be managed by a centralized network management identity or can be self-organized by communicating with each other via wireless air-interfaces or wired interfaces. The term base station also refers to access points. One such example are Femtocell systems. FIG. 1 shows a Femtocell system where Femtocell BTSs 10 are managed by a core network. Femtocells are connected to core networks 12 over the internet 14 and radio network controller (RNC) 16 through broad band connections. The provisioning of individual Femtocell BTSs is done by the core network via provisioning server 15 on a per device basis.

Figure 2A:
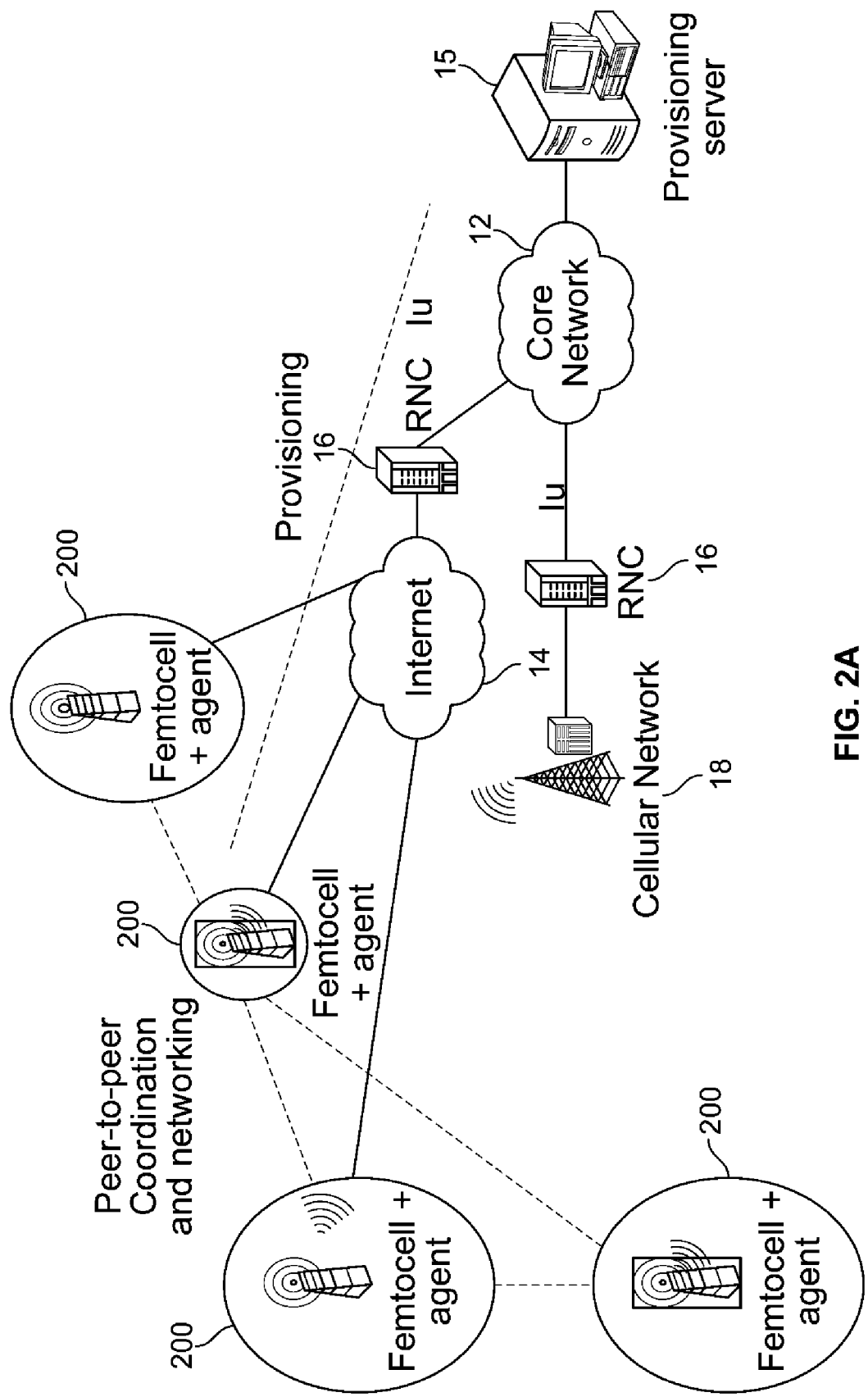
FIG. 2a shows one embodiment of a Femtocell system where the Femtocell BTSs are connected to core networks through wired or wireless broadband connections. The Femtocells are networked via either a wired backhaul or over-the-air. The provisioning of the Femtocell BTSs can be done either by the core network on a per device basis or in a coordinated fashion either under the complete supervision of the core networks, partial supervision of the core networks or without supervision at all.

FIG. 2a shows a Femtocell system where Femtocell BTSs 200 are connected to the core networks 12 through wired or wireless broadband connections. The Femtocells are networked via either a wired backhaul or over-the-air. The provisioning of the Femtocell BTSs can be done either by the core network 12 on a per device basis or in a coordinated fashion either under the complete supervision of the core networks, partial supervision of the core networks or without supervision at all. A Femtocell is a smaller cellular base station or access point of cellular network 18 that operates in either licensed frequencies, or if so desired, in unlicensed frequencies. It is typically designed for use in residential or small business environments. Femtocells use the available broadband access, such as DSL, cable, or fixed wireless broadband access networks, to tunnel the user and control data through the broadband and connect to the cellular core network backhauls. This is illustrated in FIG. 1. The femtocell incorporates the functionality of a typical base station but extends it to allow a simpler, self contained deployment; for example, a UMTS femtocell containing a Node B, and RNC with Ethernet for backhaul. Although much attention is focused on UMTS, the concept is applicable to all standards, including GSM, CDMA2000, TD-SCDMA and WiMAX solutions.

When the BTSs are using the same frequency for transmitting and receiving with relatively large transmitting power and when they are closer to each other, such as Femtocells, performance such as system and user throughput or QoS get degraded due to the interference between the BTSs and among the users. Smart antenna technique can be used in a coordinated way among a group of BTSs, such as Femtocells, to reduce interference or manage how interference happens to achieve performance enhancement such as higher system throughput or better QoS to individual applications.

There has been much work on beam forming, MIMO, and pre-coding for base stations, however, most of the work focus on either algorithms themselves, or how to apply them to individual base stations in order to improve the performance of the specific base station service areas. They do not address how to coordinate the usage of the antenna array among multiple base stations.

Adaptive beam forming can be performed based on certain measurements in order to determine the direction and strength of the beam patterns. One example is Direction-Of-Arrival (DOA) based beam forming. In the DOA based beam forming, the dominant direction of arrival is estimated using an antenna array with a certain geometry, e.g., Uniform Linear Array (ULA) or Uniform Circular Array (UCA), with a small inter-element distance ($d \leq \lambda/2$). This directional information is then utilized to steer a transmission beam created by linear weighting towards the terminal.

In a typical Femtocell system, the Femtocell BTSs are connected to the core networks through broadband connection. The provisioning of individual Femtocell BTS is done by the core network on a per device basis. When a Femtocell system has the capability to network and coordinate via either a wired backhaul or over-the-air, management and provisioning of Femtocell BTSs can be done either by the core network on a per device basis or in a coordinated fashion either under the complete supervision of the core networks (completely centralized), partial supervision of the core networks (partially centralized) or without supervision at all (distributed).

Figure 2B:
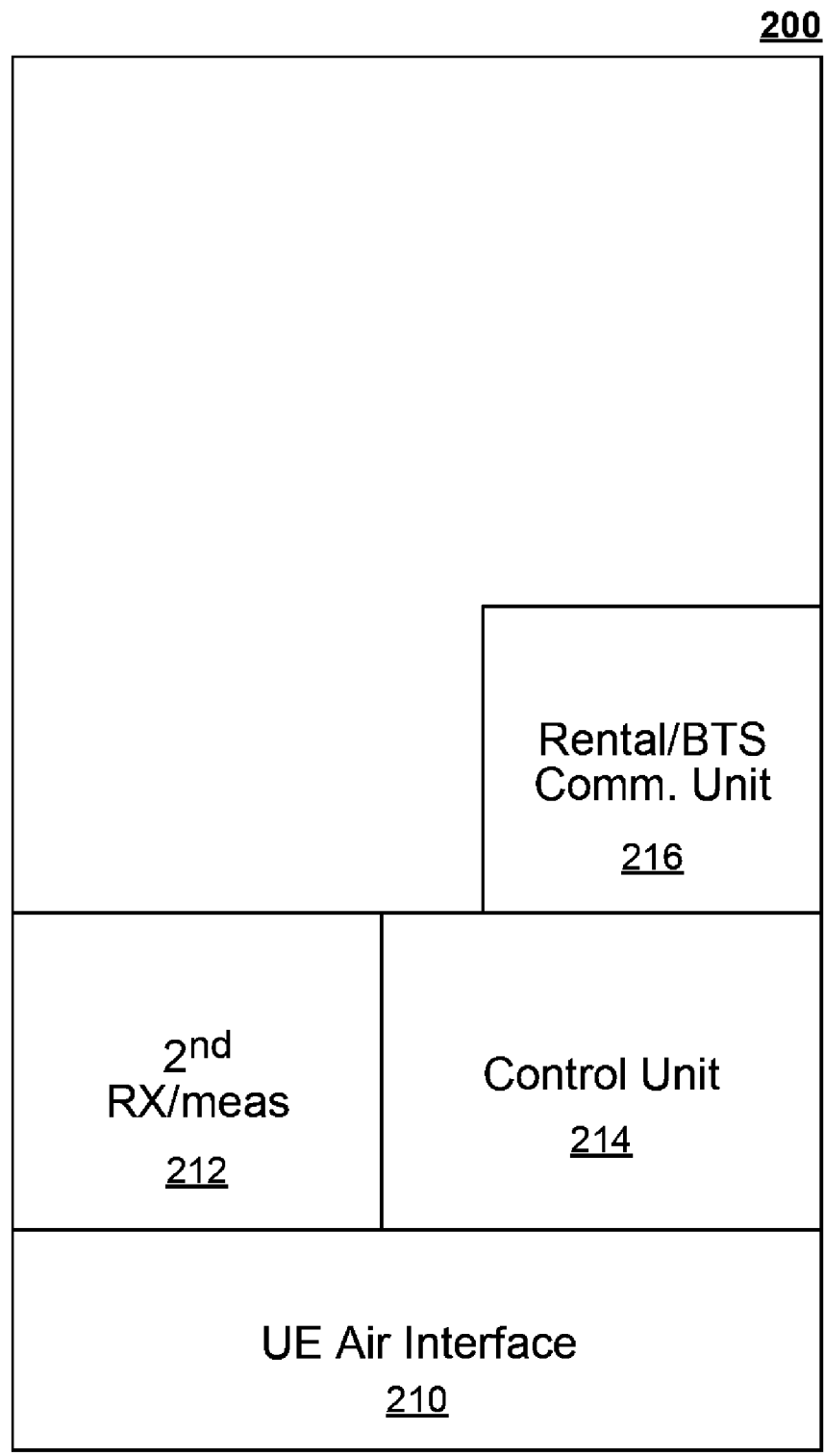
FIG. 2b of a block diagram of a Femtocell BTS.

An example of a BTS 200 is shown in FIG. 2b with elements of the BTS not relevant to this discussion omitted. The BTS includes a Femtocell BTS device 200 that has a BTS air-interface transceiver system 210 for communications with associated subscribers. In one example, the system 210 is a Femtocell system. The BTS air-interface transceiver system includes an antenna system (examples of which are described herein) capable of performing beam forming. The transceiver 210 performs the functions to provide wireless communication to and from subscribers. For example, such systems are well known to provide wireless some of which implement well known standards such as GSM, CDMA2000, TD-SCDMA and WiMAX Subscribers refers to devices that are receiving and/or transmitting signals to a BTS. Subscribers are typically associated with a BTS. Such devices are also referred to as user equipment (UE). Such devices are capable of transmitting and receiving wireless signals and include devices such as cellular telephones, and other electronic equipment, such as personal computers, which are equipped with a wireless transceiver. A second receiver 212 is included that can make measurements of other BTS transmitted signals. Alternatively, the BTS air-interface transceiver can be modified to make those measurements. A control unit 214 is included that can communicate with a centralized server and/or with other Femtocell BTSs in a peer-to-peer fashion using central/peer communication unit 216 (for example, a Femto-server and Femto-Femto communication unit). The control unit generates the instructions to the BTS transceiver 210 to implement the beam forming and coordination between BTSs as described herein. Such a system uses a protocol and associated messages that support the communications between the Femtocell BTSs and centralized servers as well as communications between the control unit and the BTS transceiver 210. The control unit includes a message parser for parsing received messages and a database for storing the neighbor list described below.

According to one embodiment, BTSs, such as Femtocell base stations 200 that can network and coordinate with each other, as described above, coordinate how the beam forming is performed at each individual BTS in terms of beam direction, beam pattern, transmit power, time, frequency resources, time-frequency resources, respectively or collectively. The objective of this coordination is to improve the network work performance and reduce interference, so the criteria used in the beam forming coordination includes, but is not limited to, pilot or reference signal strength, bit error rate or packet error rate, data throughput, required data rate, QoS requirements, and so on. This can be done either via a centralized fashion or via a distributed fashion. This can be done with the consideration of different antenna array configurations.

For a beam former using uniform linear array with N omni-directional antenna elements at locations of $x_1, x_2, \ldots x_N$, assuming a plane wave with wavelength $\lambda$ incident from direction $\theta$ measured along the end fire, the array manifold of the nth element is $$m(\theta)_n = \exp\left(-j\frac{2\pi}{\lambda}x_n\cos\theta\right),$$

The output beam pattern after applying the weights $w_n$ is $$G(\theta)_n = \sum_{n=1}^{N} w_n m(\theta)_n = \sum_{n=1}^{N} w_n \exp\left(-j\frac{2\pi}{\lambda}x_n\cos\theta\right),$$

The complex weight vector $w=[w_1, w_2, \ldots w_N]^T$ can be chosen in order to obtain a desired beam pattern for the transmitter. The same equation can be applied to the receiver side and it results in receiver beaming forming.

Figure 3:
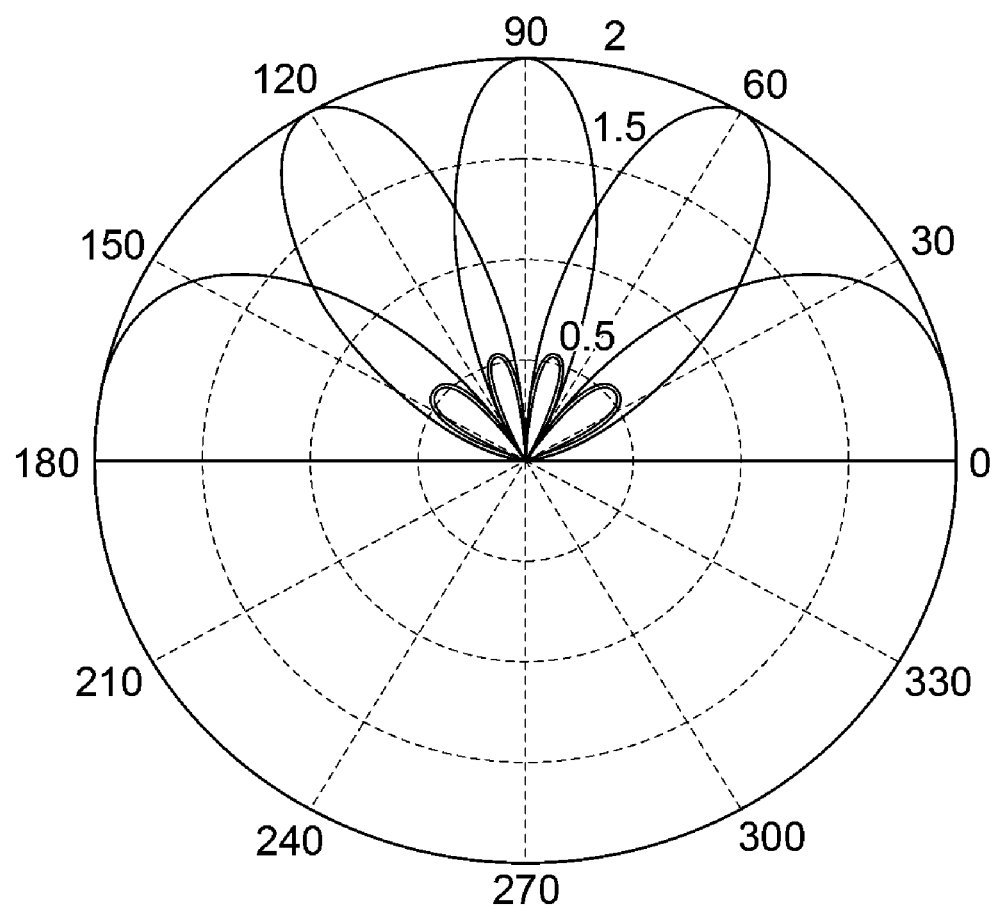
FIG. 3 plots beam pattern for a 4 elements Uniform Linear Array with the distance between the elements being half a wavelength.

An example of a beam pattern for a 4 element ULA is shown in FIG. 3 where $$W = [w_1 w_2 w_3 w_4] = \begin{bmatrix} 1 & 1 & 1 & 1 \\ 1 & j & -1 & -j \\ 1 & -1 & 1 & -1 \\ 1 & -j & -1 & j \end{bmatrix}$$

By choosing different weights adaptively from the above matrix, receiver or transmitter beam patterns can be formed to enhance the desired transmitted or received signal or reduce the interfering signal(s) in certain directions or areas.

Figure 4:
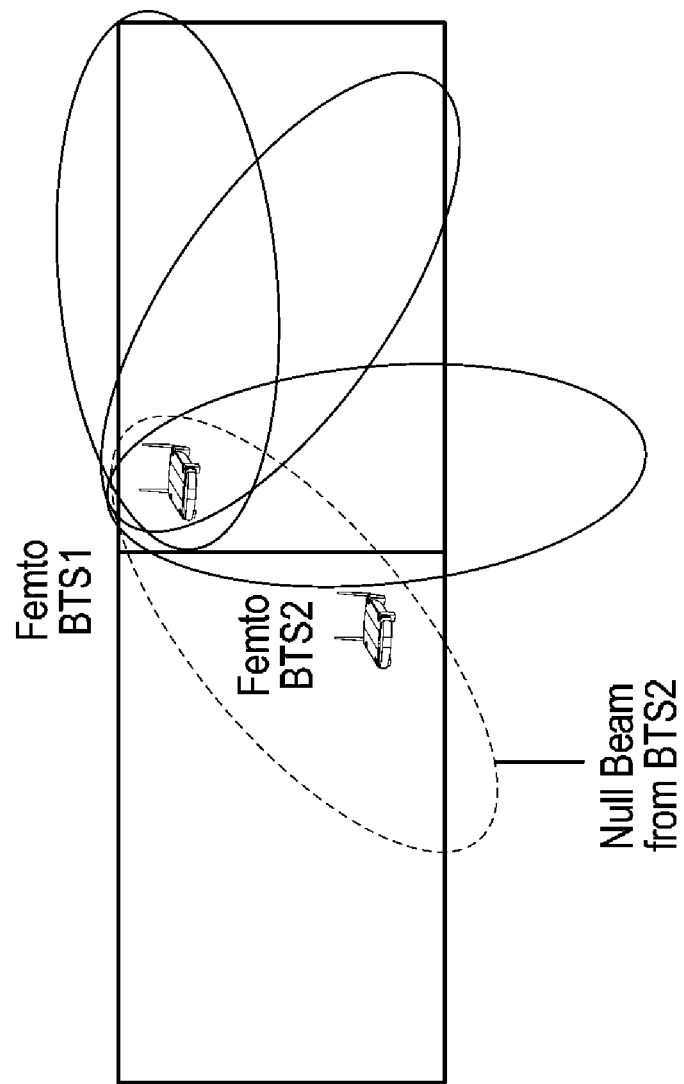
FIG. 4 shows an example of the creation of a null beam by a Femtocell BTS in the direction of a neighboring BTS.

According to one embodiment, assume that the neighboring Femtocell BTSs have the knowledge of the relative direction and relative distance of each other. The terms "neighbor" and "neighboring" are used to refer to BTSs whose transmissions can impact the performance of each other. This knowledge can come from information sent to the central unit from the central/BTS communication unit 216 or from the 2nd receiver/measurement unit 212. The UE air interface 210 of the Femtocell BTS applies appropriate weights to create one or more null beams on transmit or receive or both in the directions of the neighboring BTSs. When the distance between the neighboring BTSs are relatively far compared to distance between the said BTS and its associated user equipments (UE), pointing a null pattern on the transmitter toward the neighboring BTSs can reduce the interference from the BTS to the UEs of the neighboring Femtocells on the downlink (DL) direction. Applying a null pattern on the receiver toward the neighboring BTSs can reduce the interference from the UEs of the neighboring Femtocells to the said BTS on the uplink (DL) direction. This is illustrated in FIG. 4 for two Femtocell base stations BTS1 and BTS2.

Figure 5:
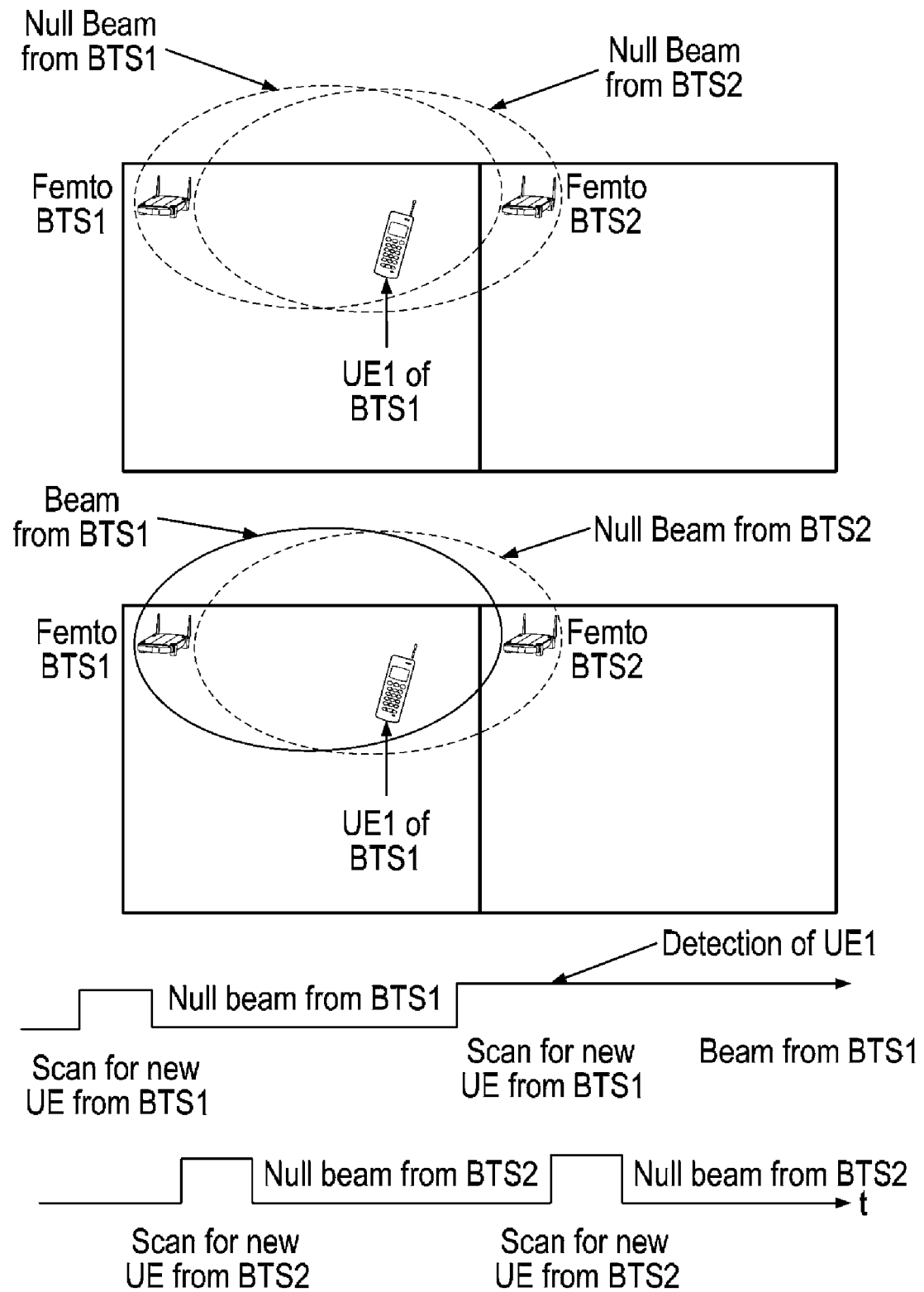
FIG. 5 shows an example where creation of null beams by two Femtocell BTSs in the direction of neighboring BTSs would cause problem for one of the BTSs. It also shows the solution where the BTSs periodically scan the null beam pattern direction to detect whether any subscribers exists.

Depending on how far the neighboring BTSs are placed, applying null patterns for each neighboring BTS may create problems because some UEs may be in the direction of a neighboring BTS. An example of such a scenario is shown in FIG. 5, where BTS1's null beam would cause the degradation in performance with UE1 or even loss of communications.

According to another embodiment, the BTS periodically "scans" the null beam area, e.g., apply weights so that it would transmit and receive signal in the original null beam directions periodically, in order to detect whether any UE is in or moved into the "null beam" area. The period can be determine either by network management parameters by the centralized server, by coordination of multiple BTSs or by individual BTS. When a UE that needs services is detected, the BTS will apply the appropriate beam pattern to the original null beam in order to service the UE with proper performance requirements. This is illustrated in FIG. 5, where BTS1 initially created the null beam in the direction of BTS2 and detected UE1 when it scanned the null beam area. BTS1 then uses the proper beam pattern instead of null beam to communicate with UE1. Note that when there are UEs in the directional null beam pattern area from both BTSs, the above method still creates degradation of performance to the UEs.

Figure 6:
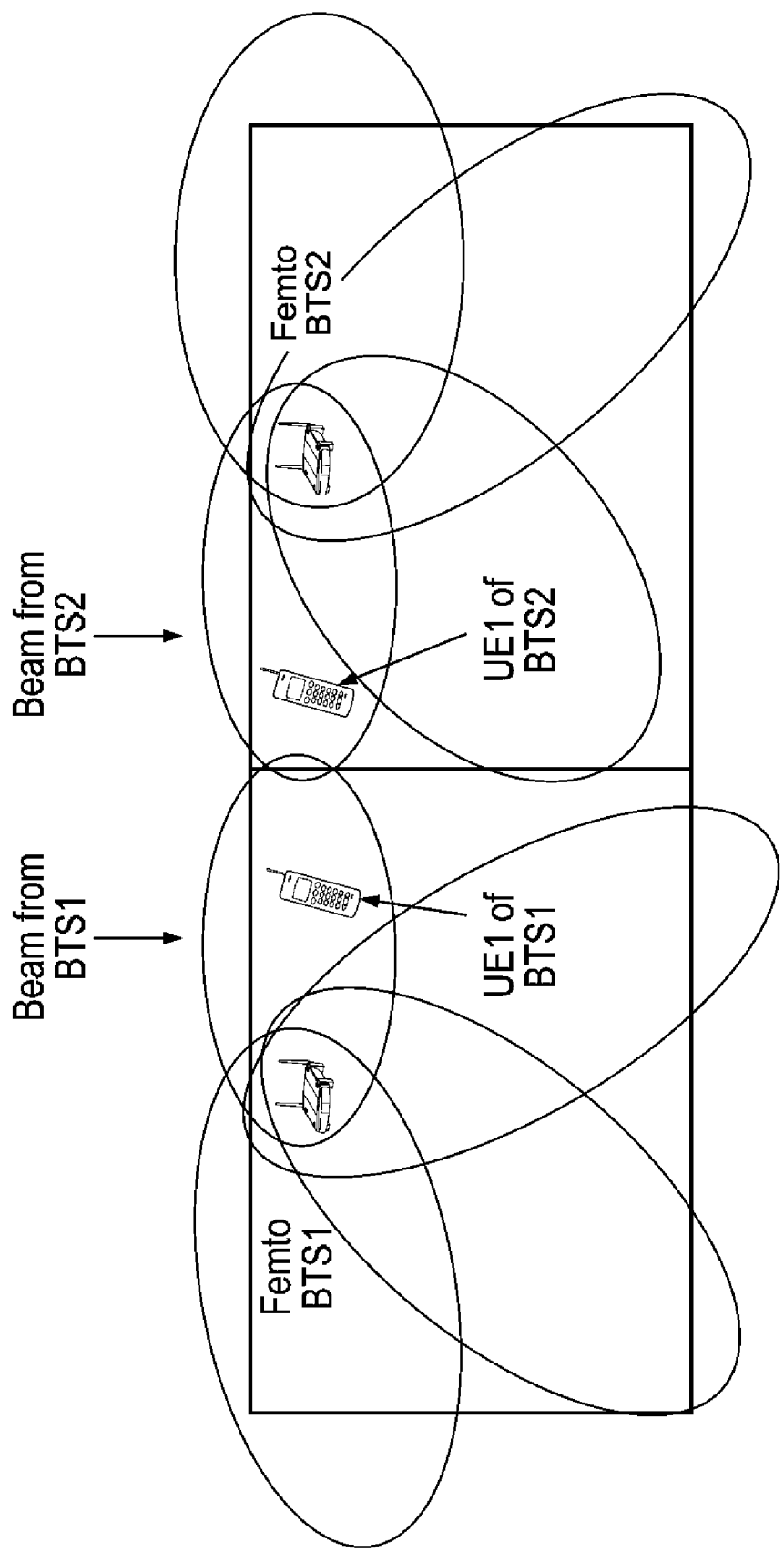
FIG. 6 illustrates transmit power adjustment on the beam so that the BTSs can service their subscribers s while controlling the interference with the neighboring subscribers.

According to another embodiment of this invention, the BTSs lower or increase their transmit power on the DL while monitoring the DL reception quality of the UEs using certain metrics, such as BER, PER, ACK/NACK from DL ARQ or Hybrid-ARQ, and so on. When the metrics from UEs in all BTSs coverage areas have satisfactory performance, which depends on the QoS class of each UE or application, BTSs would keep the transmit power level until one or more metrics are not satisfied. This is illustrated in FIG. 6.

In the case when a BTS reaches a pre-determined minimum transmit power level before the performance metrics from the UEs in other BTS serving areas still have not been satisfied, most likely due to that interference from the said BTS, the said BTS should stop lowering the transmit power. Other techniques detailed later can then be used to achieve overall system performance satisfaction.

Figure 7:
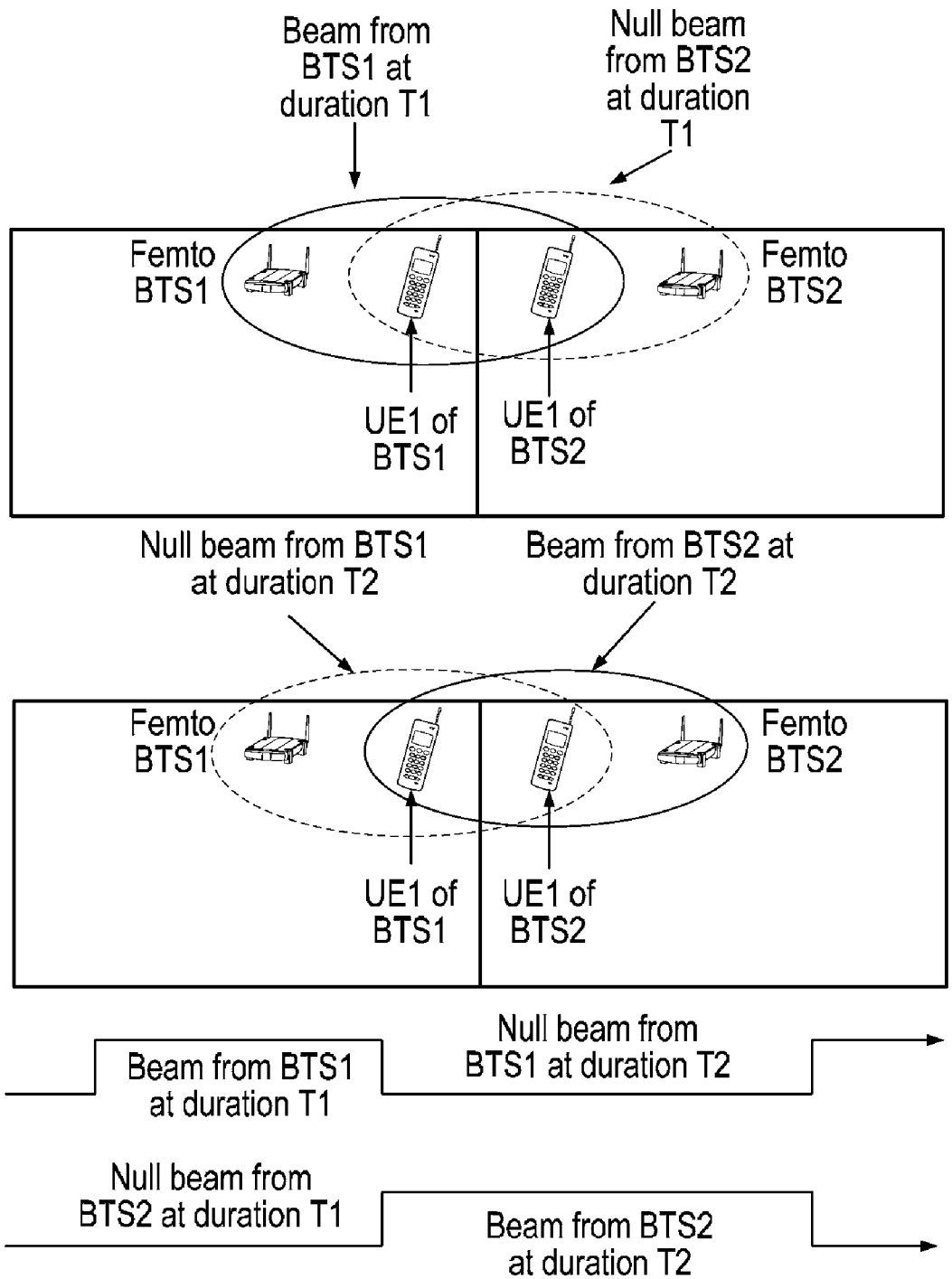
FIG. 7 shows an example of time-division multiplex of beams between neighbor BTSs.

According to another embodiment of this invention, the BTSs uses the beam forming in a time-division multiplexing manner in a common coverage area where some of all the BTSs have UEs to be serviced. This is illustrated in FIG. 7. By doing so, the BTSs essentially can manage the interference and thus improve the performance beyond just adjusting transmit power. Note that the time-division can be applied to both beam and null beam, on both DL and UL. Also note that the BTSs can perform the operations in a completely centralized way controlled by the server at the gateway or core networks, partially distributed way, or completely distributed way via peer-to-peer communications.

Figure 8:
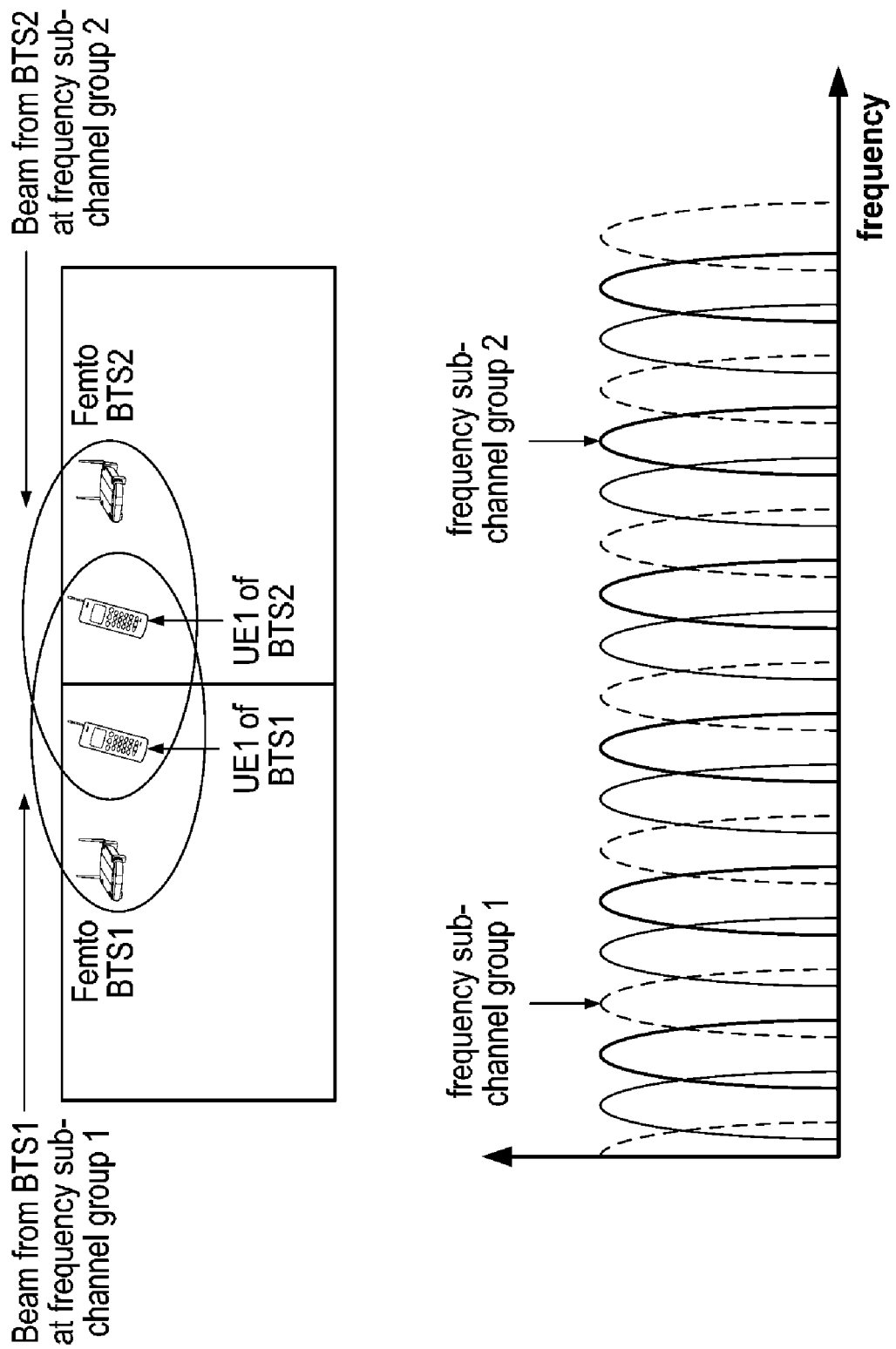
FIG. 8 shows an example of frequency-division multiplexing (based on sub-channel groups) of beams between neighbor BTSs.

According to another embodiment of this invention, each BTS uses the beam forming in a frequency-division manner. In an OFDMA system, it means using different sub-frequency group so that the UEs belonging to different BTSs but in a common coverage area receive their data only in the specific sub-frequency group. This is illustrated in FIG. 8, where UE1 of BTS1 and UE1 of BTS2 are in an area where both BTSs would interfere with each other, and this cannot be resolved by reducing the transmits power. When both UEs need real-time application support, for example, using time-division of beaming forming can be inadequate. When the overall bandwidth is not a limiting factor for either UE applications, BTSs can decide (or the server can decide, etc.) to "split" the use of frequency sub-band groups and apply the beam forming differently on each groups. Note that the frequency-division can be applied to both the beam and null beam, on both DL and UL. Also note that he BTSs can perform the operations in a completely centralized way controlled by the server at the gateway or core networks, partially distributed way, or completely distributed way via peer-to-peer communications.

Figure 9:
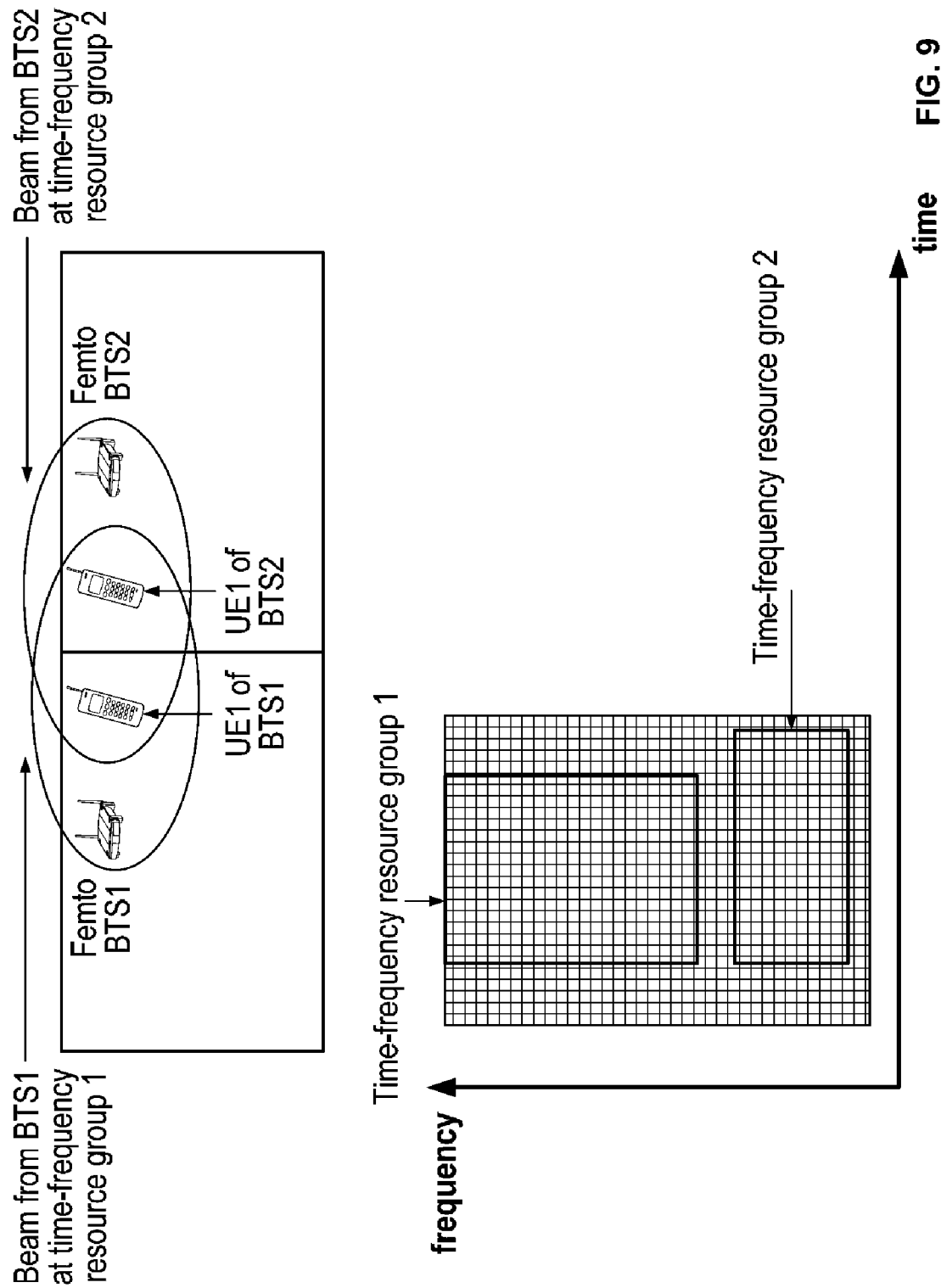
FIG. 9 shows an example of time-frequency division multiplexing (based on time-frequency resource groups) of beams between neighbor BTSs.
Figure 10A:
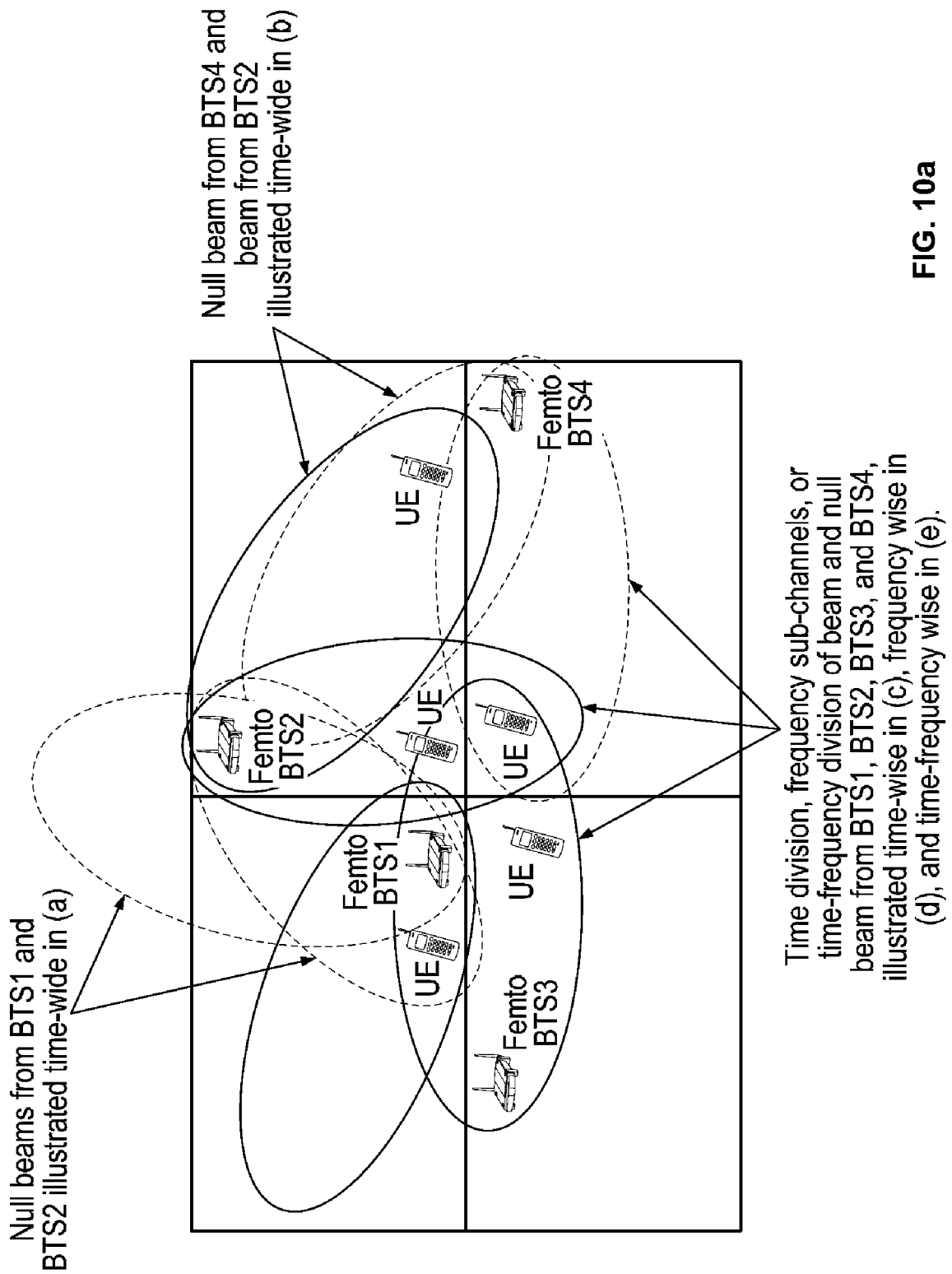
FIGS. 10a to 10d show an example of coordinated beam forming based on spatial/directional, time, frequency, and time-frequency multiplexing by a group of BTSs.
Figure 10B:
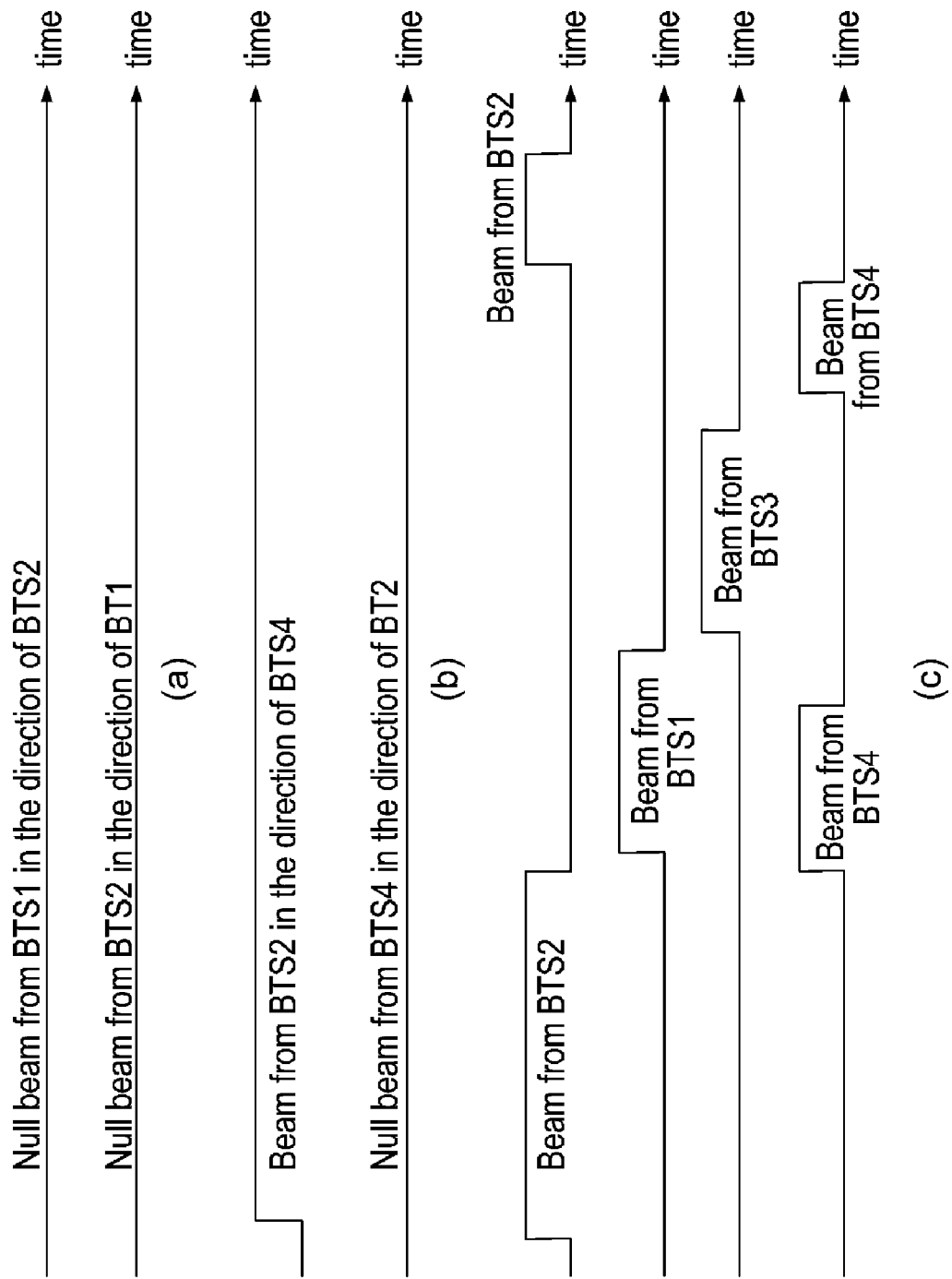
Figure 10C:
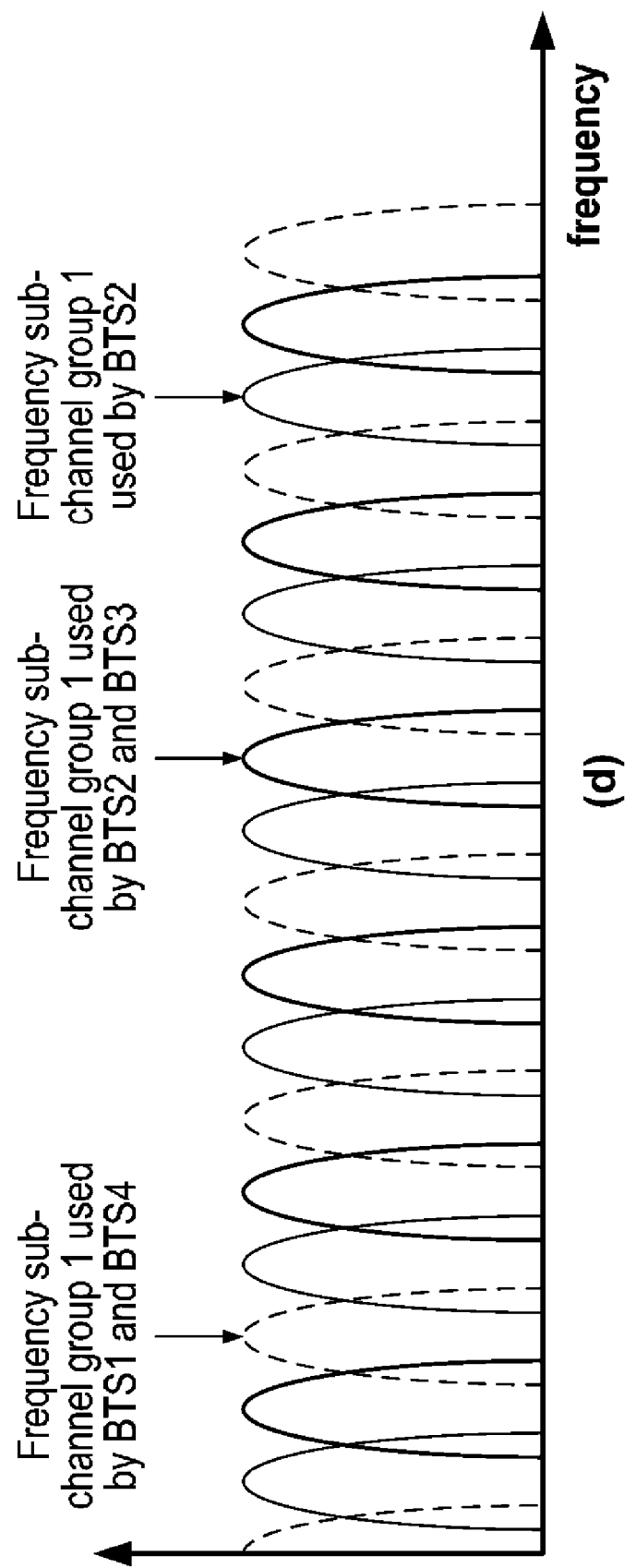
Figure 10D:
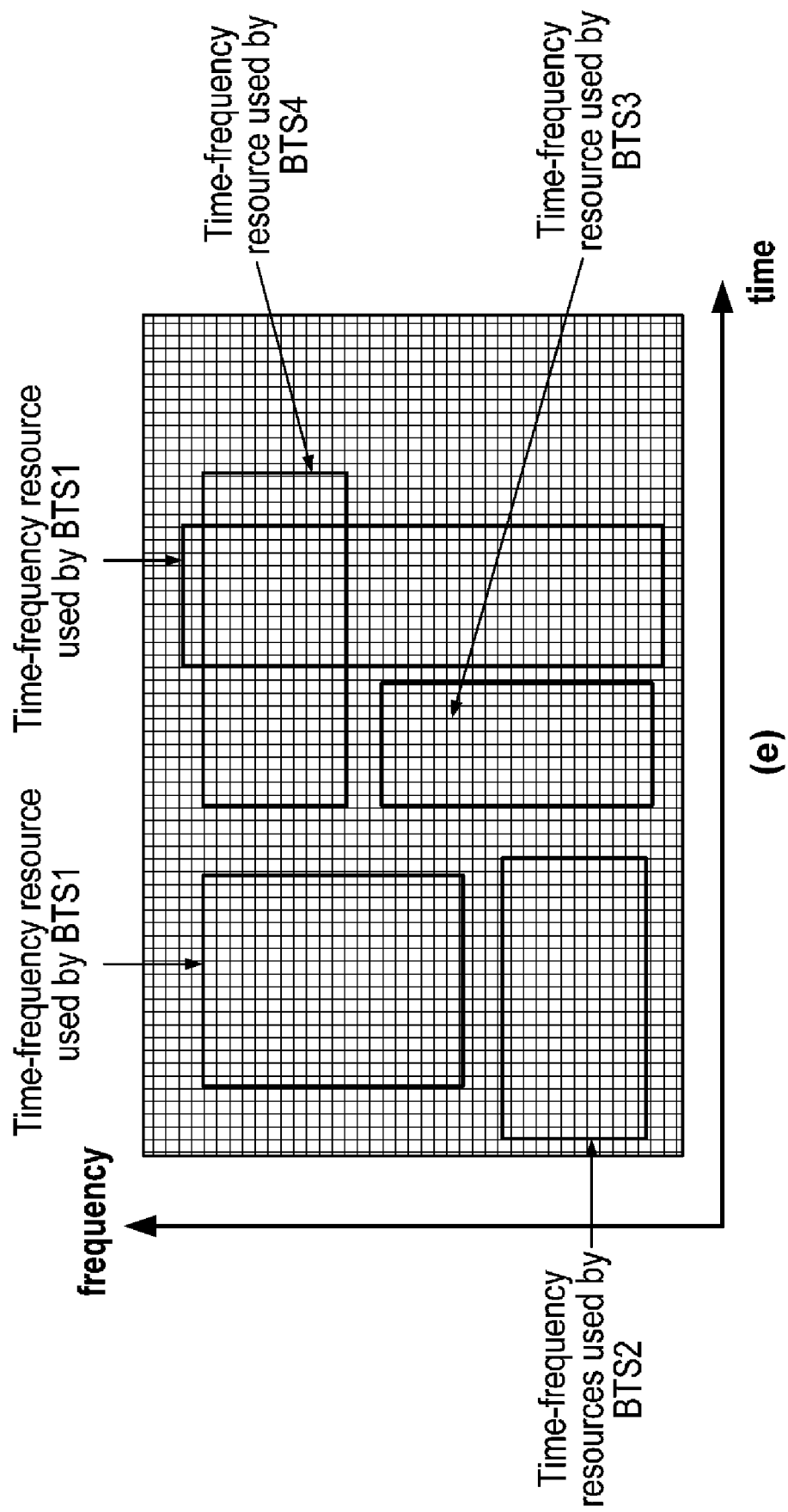
Figure 11:
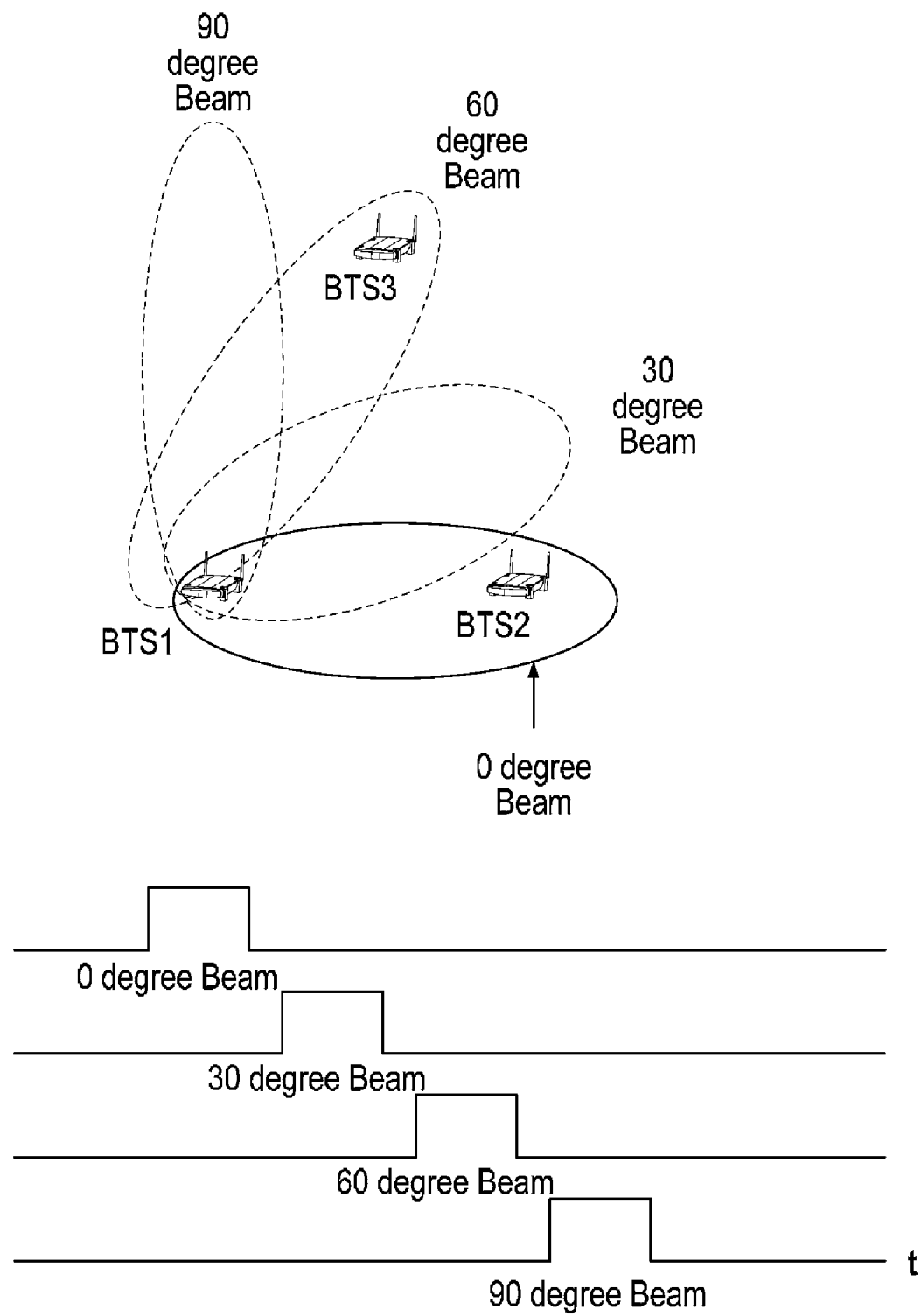
FIG. 11 illustrates an example of BTSs using directional beam forming and coordinative measurement from the neighbor BTSs to determine the direction and distance of the neighbor BTSs.

According to another embodiment of this invention, each BTS uses the beam forming in a time-frequency division manner, as shown in FIG. 9. In an OFDMA system, it means using different resources in the time-frequency plane so that the UEs belonging to different BTSs but in a common coverage area receive their data only in the specific time-frequency resources. In FIG. 9 for example, UE1 of BTS1 and UE1 of BTS2 are in an area where both BTSs would interfere with each other, and this cannot be resolved by reducing the transmits power. The BTSs can decide to use time-frequency resources in a way to satisfy certain performance requirements, for example, QoS requirements with certain data rate over certain period of time. Based on these, the BTSs can cooperatively allocate time-frequency resources for each UEs in that beam pattern coverage area, and apply the beam forming differently on each group of resources. Note that the time-frequency resource division can be applied to both beam and null beam, on both DL and UL. Also note that he BTSs can perform the operations in a completely centralized way controlled by the server at the gateway or core networks, partially distributed way, or completely distributed way via peer-to-peer communications.

Even though 2 BTSs have been used to illustrate the scenarios above, the method is readily applied to more than 2 BTSs. As illustrated in FIGS. 10a to 10d, a group of BTSs (BTS1, BTS2, BTS3 and BTS4) can coordinate the beam forming in spatial/directional, transmit power, as well as time, frequency, time-frequency multiplexing, and allocate resources to the UEs in the beam pattern. In this case, the BTSs can perform the operations in a completely centralized way, partially distributed way, or completely distributed way. Different scheduling and coordination algorithms can be used following this principle and the detailed coordination methods will be described in a later section.

According to another embodiment of present invention, the BTSs use directional beam forming and coordinated measurement from the neighbor BTSs to determine the direction and distance of the neighbor BTSs. This is also illustrated in FIG. 10. In this example, BTS1 applies beam forming using certain reference signals in four thirty degree apart directions at given time intervals. The time and interval are known to neighbor BTSs. The neighbor BTSs, i.e. BTS2 and BTS3 in this example, are capable of measuring the DL reference signal and able to communicate peer-to-peer with the BTS1. They measure the signal strength at given time and report back to BTS1. Based on the time and measurements of the signal, BTS1 can determine the direction and relative distance of the neighbor BTSs. The results depend on the measurement algorithm selected and the accuracy of the timing and beam forming algorithm selected. This information can be used to determine the direction of the neighbor BTSs that is important in some embodiments described above. It can also be used in other applications, for example, as input to the database and topology of the neighbor BTSs. Note that other algorithms, such as those used on DOA, can also be used.

According to another embodiment of present invention, other types of antenna configuration other than ULA can also be used and the methods described above are still applicable.

As an example, in a beam former using Uniform Circular Array (UCA) with N omni-directional antenna elements, the nth element of the array manifold is $$m(\theta)_n = \exp\left(-j\frac{2\pi}{\lambda}r_n\cos\left(\frac{2\pi(n-1)}{N} - \theta\right)\right),$$

where $r_n$ is the distance from the center of the array to the elements and $$\frac{2\pi(n-1)}{N}$$

is the angular position counted counterclockwise from the x-axis of the nth array element in polar coordinates.

The output beam pattern after applying the weights $w_n$ is $$G(\theta)_n = \sum_{n=1}^{N} w_n m(\theta)_n = \sum_{n=1}^{N} w_n \exp\left(-j\frac{2\pi}{\lambda}r_n\cos\left(\frac{2\pi(n-1)}{N} - \theta\right)\right).$$

The complex weight vector $w=[w_1, w_2, \ldots w_N]^T$ can be chosen in order to obtain a desired beam pattern the transmitter. The same equation can be applied to the receiver side and it results in receiver beam forming.

As in all of the embodiments in the ULA case, the BTSs can coordinate the beam forming in spatial/directional, transmit power, as well as time, frequency, time-frequency multiplexing, as illustrated in FIGS. 10a to 10d. The BTSs can perform the operations in a completely centralized way, partially distributed way, or completely distributed way. Different scheduling and coordination algorithms can be used following this principle and the detailed coordination methods will be described in a later section.

It should be noted that even though omni directional antenna array elements are used as examples in the above embodiments, the results can be easily extended to directional antenna array.

As a generalized form of beam forming, pre-coding with pre-defined codebook are used in some 4G standards, such as LTE. A pre-coding scheme can be used in a MIMO system where the antenna configuration is pre-defined. In this case, the codebook that defines the weights can be derived based on the desired directional beam pattern. It can also be used in a MIMO system where the antenna configuration is not pre-determined. In that case, the codebook is derived based on criteria such as maximizing the signal level under certain channel conditions.

Figure 12:
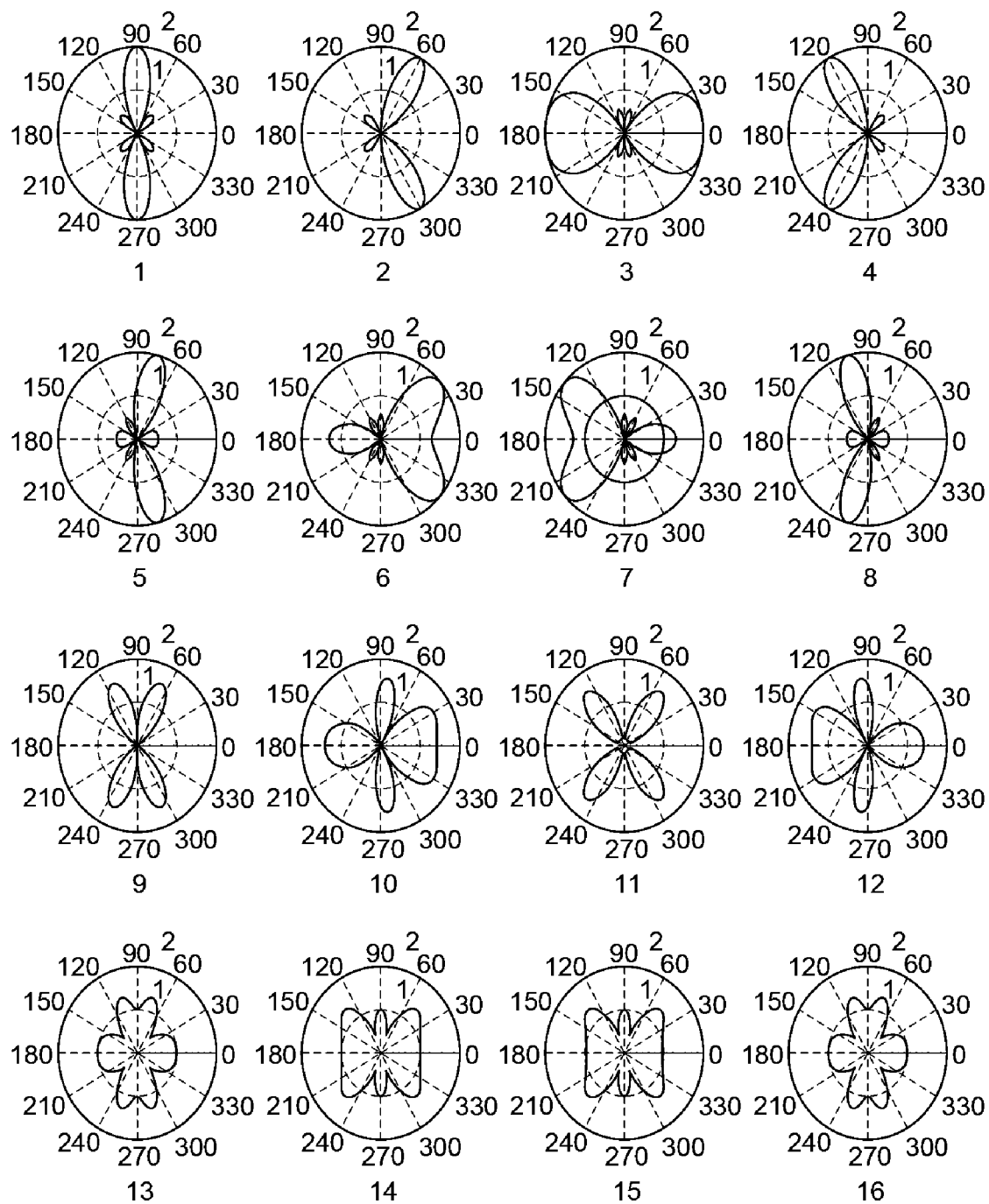
FIG. 12 illustrates beam patterns using a codebook defined in the 3GPP LTE standard for down link and applied to a 4 elements ULA with the distance between the elements being a half wavelength.
Figure 13:
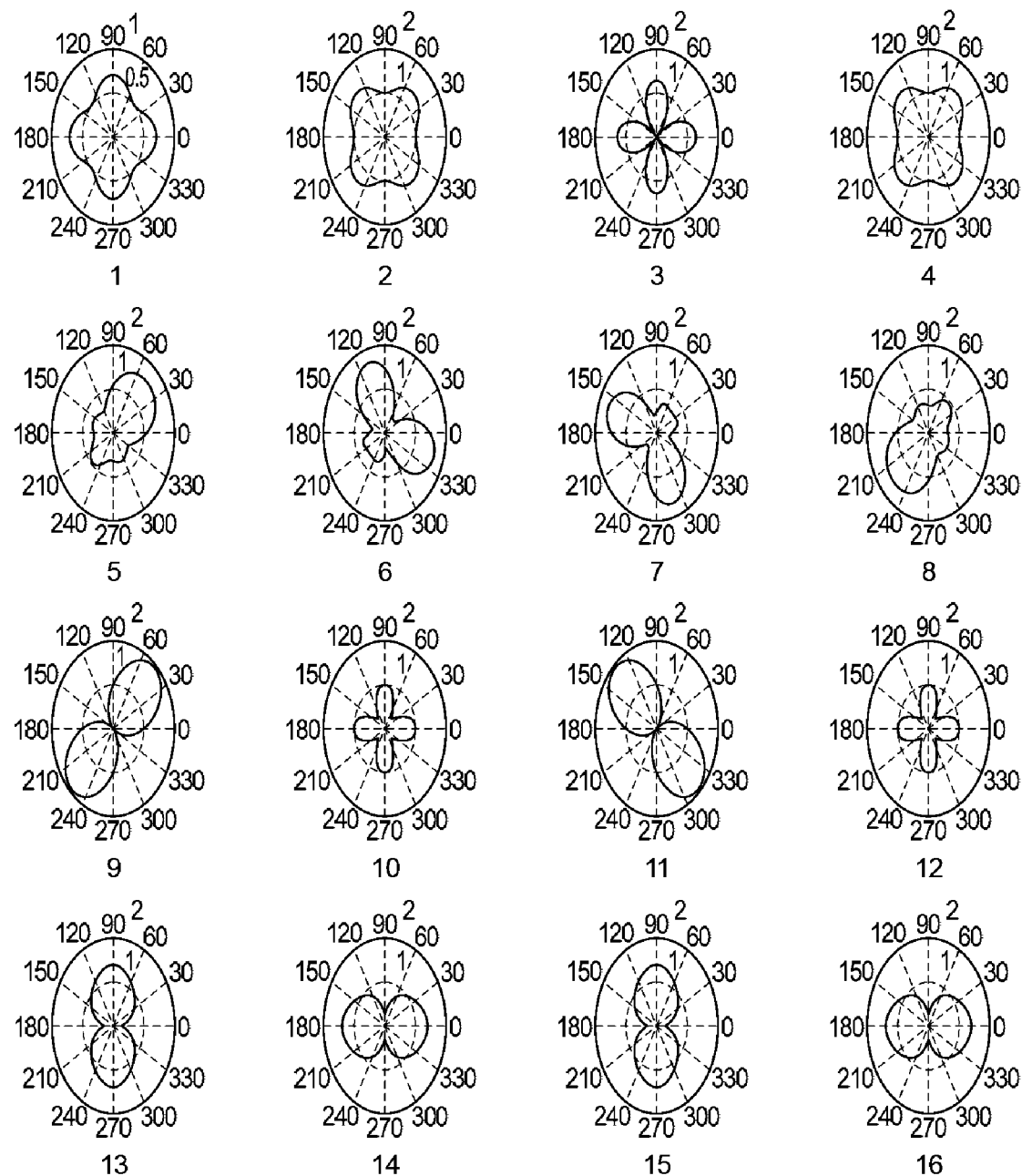
FIG. 13 illustrates beam patterns using the codebook defined in 3GPP LTE standard for down link and applied to a 4 elements UCA with the distance between the elements being 0.42 wavelength.

As an example, Table 1 shows the codebook for a 4-element antenna array, where $W_n^{\{s\}}$ denotes the matrix defined by the columns given by the set $\{s\}$ from the expression $W_n = I - 2u_n u_n^H/u_n^H u_n$ where I is the 4×4 identity matrix and the vector $u_n$ is given by the table. The beam patterns for one transmission layer when using ULA with element spacing being $\lambda/2$ is shown in FIG. 12 and that of using UCA with element spacing being $0.42\lambda$ is shown in FIG. 13.

TABLE 1

Codebook for DL transmission using 4 antennas ports defined in LTE standard

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |

TABLE 1-continued

Codebook for DL transmission using 4 antennas ports defined in LTE standard

| Codebook index | $u_n$ | Number of layers v | | | |
|---|---|---|---|---|---|
| | | 1 | 2 | 3 | 4 |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

According to one embodiment of present invention, the codebook can be partitioned into two or more subsets based on the direction or directional region of stronger beam patterns. The Femtocell BTSs choose the subsets of the codebook that have stronger beam pattern in the direction of the UEs but avoid using the subsets that have stronger beam patterns in the direction of neighbor BTSs.

In FIG. 12, the LTE codebook for DL transmission with one layer is shown as an example for the above and following embodiments. One possible way is to partition the 0 to 180 degree plane into 6 directional regions with 30 degree spacing, and group those with strong beam patterns in each directional region. For 0-30 degree, the weights subset include indices 3, 6, 7, 10, 12, 13, 14, 15, 16; for 30-60 degree, weights subset include indices 2, 6, 11, 14, 15; for 60-90 degree, weights subset include indices 1, 5, 9, 10, 13, 16; for 90-120 degree, weights subset include indices 1, 4, 8, 9, 13, 16; for 120-150 degree, weights subset include indices 4, 7, 11, 14, 15; for 150-180 degree, weights subset include indices 3, 7, 10, 12, 13, 14, 15, 16. The same partitioning method can be applied to different directional regions. When using an omni directional antenna or a directional antenna different than the 180 degree example, the partitioning can be done in a similar way but it results in different subsets. For different antenna array configuration, such as an UCA shown in FIG. 13, a similar partition method can be applied.

According to another embodiment of present invention, the codebook is partitioned into two or more subsets based on the direction of null beam patterns. The Femtocell BTSs choose the subsets of the codebook that have null beams in the directions of neighbor BTSs.

Using the LTE codebook for DL transmission with one layer as shown in FIG. 12 as an example again, one possible way is to partition a 0 to 90 degree plane into 4 directions with 30 degree spacing, and group those with null beam pattern in each direction. For example, for 0 degree null beam subset, indices include 1, 2, 4, 5, 8, 9, 11; for 30 degree null beam subset, indices include 1, 2, 4, 5, 7, 8, 9, 11, 12, 13, 16; for 60 degree null beam subset, indices include 1, 3, 4, 5, 6, 7, 8, 10, 12, 13, 14, 15, 16; for 90 degree null beam subset, indices include 2, 3, 4, 5, 6, 7, 8, 9, 11. The same partitioning method can be applied to different directions. When using omni directional antennas or directional antenna different than 90 degrees, the partition can be done in a similar way but it results in different subsets. For different antenna array configuration, such as an UCA shown in FIG. 13, similar partitioning methods can be applied.

According to another embodiment of present invention, the codebook is partitioned into two or more subsets based on a combination of the direction of stronger beam patterns and null beam patterns. The Femtocell BTSs choose the subsets of the codebook that have stronger beam pattern in the direction of the UEs but have null beam patterns in the direction of neighbor BTSs.

Using the LTE codebook for DL transmission with one layer shown in FIG. 12 as an example again, one possible way is to partition 0 to 90 degree plane into 4 directions with 30 degree spacing, and group those with stronger beam in certain directional regions while having null beam in a desired direction. For example, for beam covers 0-30 degree while having null beam in 90 degree direction, indices include 3, 6, 7; for beam covers 60-90 degree while having null beam in 30 degree direction, indices include 1, 5, 9, 13, 16. The same partitioning method can be applied to different combinations of directional regions and directional nulls. When using omni directional antennas or directional antenna different than 90 degrees, the partition can be done in a similar way but it results in different subsets. For different antenna array configuration, such as an UCA shown in FIG. 13, similar partitioning method can be applied.

Figure 14:
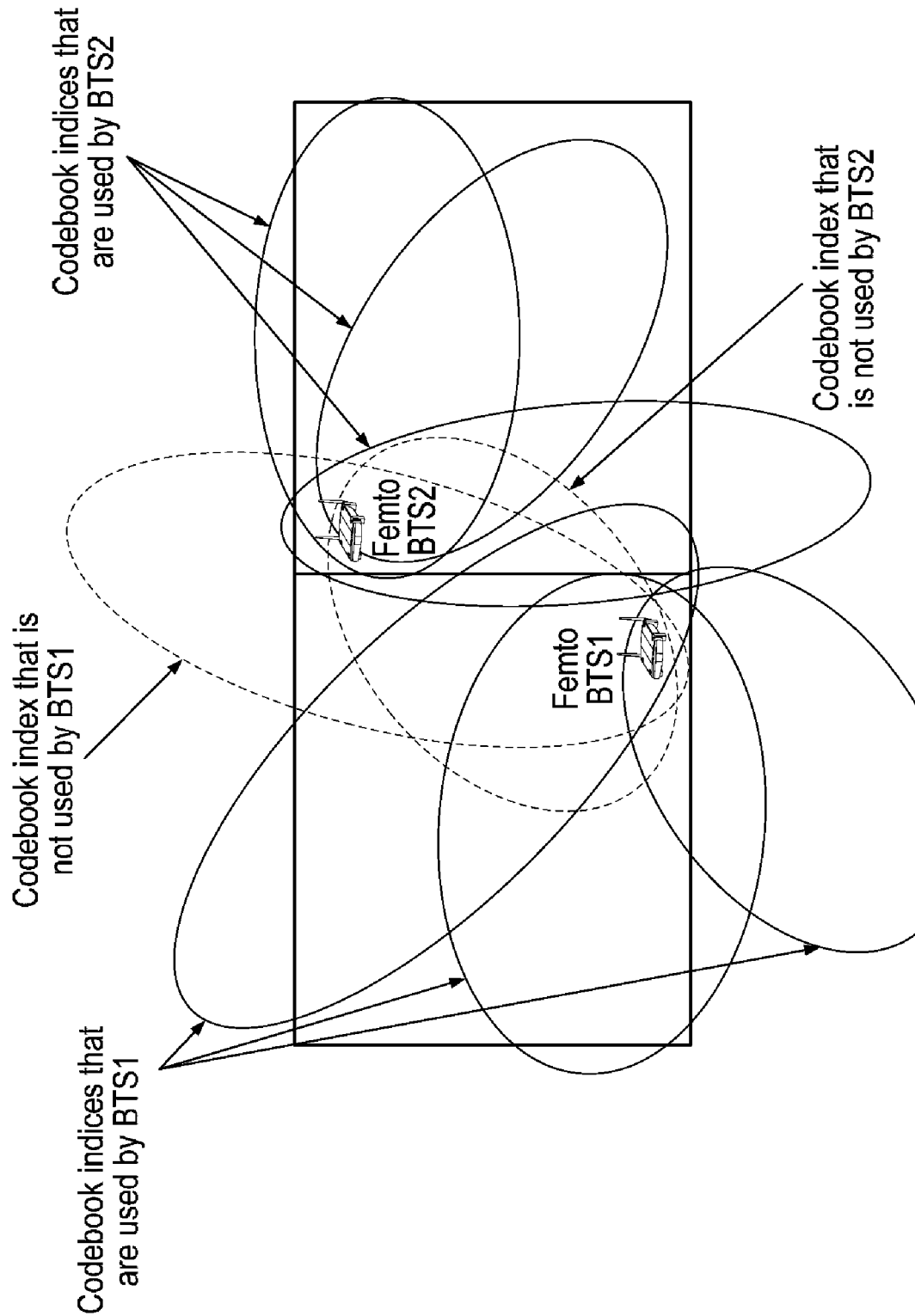
FIG. 14 illustrates an example of coordinated beam forming based on spatial and directional codebook partitioning by a group of BTSs.

An example of coordinated beam forming based on codebook partitioning is illustrated in FIG. 14, where BTS1 and BTS2 use the same partitioning of the codebook but use different subsets in order to reduce the interference in the desired directions.

Figure 15:
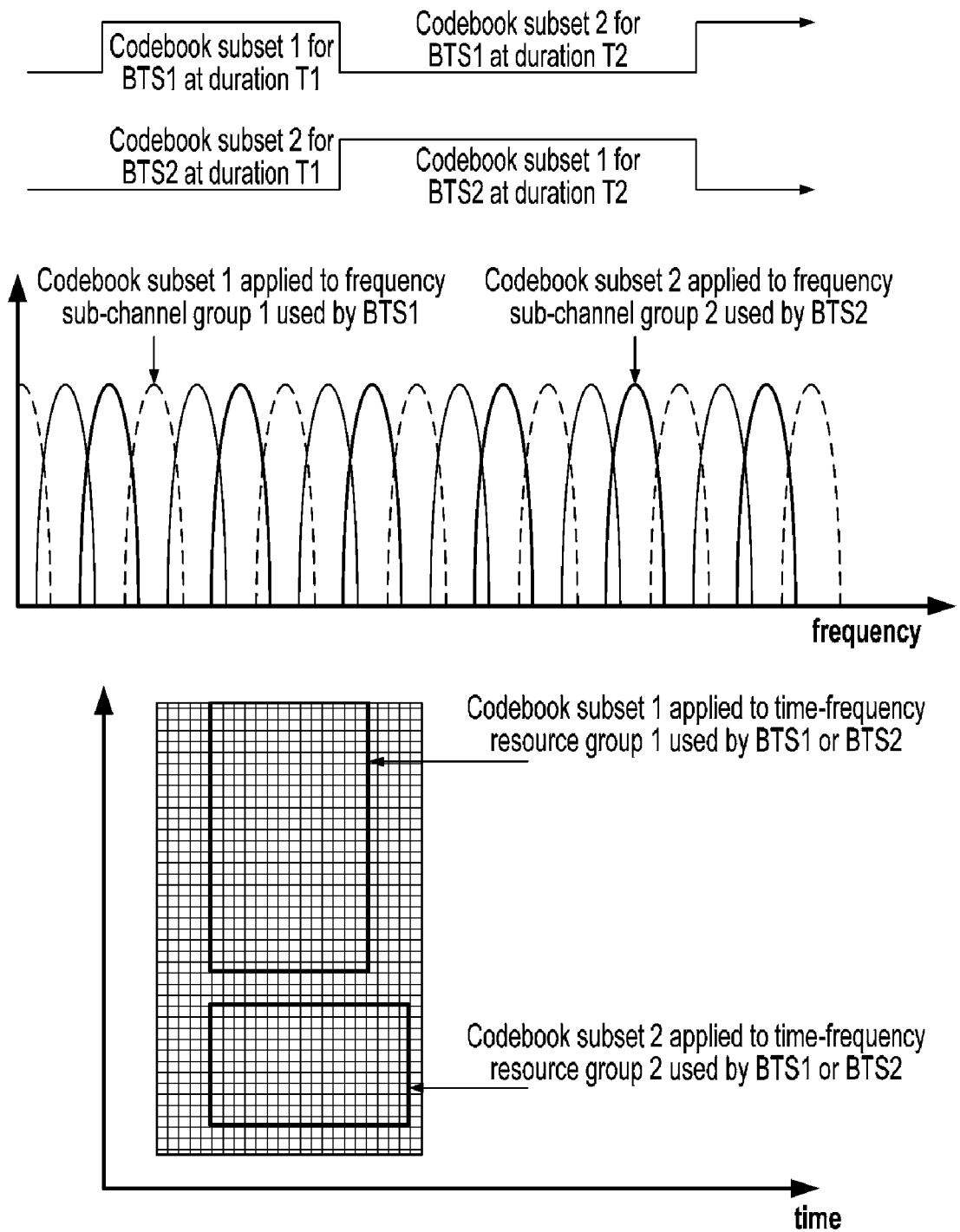
FIG. 15 illustrates an example of coordinated beam forming based on time, frequency, and time-frequency multiplexing by a group of BTSs.

According to another embodiment of present invention, the subsets of codebook can be applied to BTSs on DL or to UEs on UL in a time-division, frequency-division, or time-frequency division among BTSs. Such time, frequency, time-frequency based coordination based on codebook partitioning is illustrated in FIG. 15. In this case, the BTSs can perform the operations in a completely centralized way, partially distributed way, or completely distributed way. Different scheduling and coordination algorithms can be used following this principle and the detailed coordination methods will be described in a later section.

According to another embodiment of present invention, the codebook is partitioned differently into subsets for different antenna configurations, such as but not limited to, different elements spacing, different antenna geometry, e.g. circular, linear, rectangle, etc.

According to another embodiment of present invention, the codebook can be partitioned differently into subsets for different BTSs.

According to another embodiment of present invention, the codebook can be partitioned differently into subsets for different users/UEs based on their locations, channel conditions, and service requirements such as QoS.

According to another embodiment of present invention, the codebook can be partitioned differently into subsets for different QoS requirements. For example, for higher QoS requirements, expand the subset to just reach the required QoS level even though it have certain undesired beam patterns in certain direction that could create some level of interference to neighbor Femtocell BTSs.

For arbitrary antenna array geometries and element spacing, the codebook based beam forming can also be used not in the beam pattern sense but more from the total channel information sense. In this case, the UEs need to feedback channel information related parameters such as channel quality indicator or channel matrix rank or indices of the codebook.

According to one embodiment of present invention, the codebook is partitioned into two or more subsets based on the feedback from the neighbor BTSs and the said BTS uses one or more subsets based on the performance requirements. The said BTS will transmit the reference signal on the DL. The neighbor BTSs with the capability of measuring other BTS's DL, as described earlier, will measure the reference signal and calculate feedback parameters if needed, and then send the feedback to the said BTS. The UEs of the said Femtocell also measure the reference signal of the said BTS as well as the neighbor BTSs and provide feedback, which is usually required by the air-interface standard. Based on the feedback from both its UEs and neighbor BTSs, the said BTS would partition the codebook into subsets. For example, it can partition the codebook into those that give better performance to all or some UEs, and those that give less interference to the neighbor BTSs. The said BTS would choose to use the subsets that give better performance to UEs while less interference to the neighbor BTSs.

It is possible that the better performance and less interference weights are not mutually exclusive. In this case, according to another embodiment of present invention, the neighboring BTSs can use the same subset or overlapped subsets in the time-division, frequency-division, or time-frequency division multiplexing fashion. Such time, frequency, time-frequency based coordination is similar to those illustrated in FIG. 15. In this case, the BTSs can perform the operations in a completely centralized way, partially distributed way, or completely distributed way. Different scheduling and coordination algorithms can be used following this principle and the detailed coordination methods will be described in a later section.

Even though 4 antenna elements are used in the above embodiments, it can be readily extended to more or fewer antenna elements.

According to another embodiment of the present invention, the coordination between the BTSs can be in a completely centralized way, partially distributed way, or completely distributed way.

According to another embodiment of the present invention, in order to make the coordination more efficient and meaningful, a neighbor list will be formed based on selected criteria, such as the measurement of neighboring BTSs from each BTS. When the measurements, such as pilot signal strength or the interference level, distance in RF signal strength sense, direction, are above pre-determined thresholds (or dynamically calculated thresholds), and optionally, the relative position of the BTSs based the measurement, such as DOA, is known, the neighbor list or topology can be formed. The neighbor list can also be further divided into multiple levels based on different criteria or different thresholds, if so desired. The neighbor list changes dynamically based on the real-time measurements. The server on the network maintains the neighbor list for all the BTSs, and each BTS maintains and copy of its own neighbor list.

According to another embodiment of the present invention, when the coordination is completely centralized, the BTSs send the measurements and information required for resource allocations to the network via in-band signaling or out-of-band signaling or a combination of both. The measurements and information include, for example, interference level and direction of the interfered BTSs, bandwidth or data rate requirement for its current applications, channel information for sub-frequency groups or codebook index from the UEs in the interfered areas, average throughput of the BTSs, and so on. The network uses this information to coordinate the beam forming by allocating resources defined in previous embodiments using certain resource management algorithms. This corresponding allocation and coordination information are sent back to each BTSs. The scheduler in each BTS has lower priority than the centralized network resource manager in the sense that the BTS resource management should first allocate those resources specified by the centralized resource manager to the UEs associate with the beam forming operation specified by the centralized control, and then allocate the remaining resources for its UEs based on it scheduling algorithm. Different scheduling and resource management criteria and algorithms can be applied for each BTS.

According to another embodiment of the present invention, when the coordination is partially centralized, the BTSs send the measurements and information required for resource allocations to the network via in-band signaling or out-of-band signaling or a combination of both. The measurements and information include, for example, interference level and direction of the interfered BTSs, bandwidth or data rate requirement for its current applications, channel information for sub-frequency groups, or codebook index from the UEs in the interfered areas, average throughput of the BTSs, and so on. The network uses this information to coordinate the beam forming by allocating resources defined in previous embodiments using certain resource management algorithms. This corresponding allocation and coordination information are sent back to each BTSs. The BTS uses the information sent back by the centralized network resource manager as input to its scheduler in a way that they would have the same priority as other resources and UEs. Different scheduling and resource management algorithms can be applied here.

According to another embodiment of the present invention, when the coordination is completely distributed, the BTSs send the measurements and information required for resource allocations to its neighbor BTSs determined by its neighbor list via out-of-band signaling. The information sent to specific neighbor only includes those related to that BTS. For example, interference level and direction of the specific BTS, bandwidth or data rate requirement for its current applications, channel information for sub-frequency groups, or codebook index from the UEs interfered by that BTS, its request for time, frequency group, or time-frequency resources, average throughput of the BTSs, and so on. Each BTS sends relevant information only to those neighbor BTSs on the neighbor list.

According to one embodiment of the present invention, the receiving neighbor BTSs will accept the request, deny the request or send back a modified version of the request based on predetermined algorithms. One example of the modified version of the request can be granting with less resources than requested or granting the resources but with a shorter time period or a time delay.

According to another embodiment of the present invention, the neighbor BTS that received the information and requests from other neighbor BTSs shall use the information either as a constraint to its scheduler or as part of the overall input to its scheduler. For example, if the 1st BTS sends the channel information, date rate requests and other necessary information from the UE that is in the interfered area of the 2nd BTS, this channel information can be used as input to the scheduler of the 2nd BTS together with information from UEs in the 2nd BTS. Depending on outcome from the scheduling results, the 2nd BTS decides whether to accept, deny or propose a new resource allocation.

According to another embodiment of the present invention, the 1st and the 2nd BTSs shall use the following procedure depending on whether the request from the 1st BTS is accepted, denied or modified.

When the request is denied, the 1st BTS can either renegotiate e.g. send a modified request with less resource requirements, or accept the results as it and run the scheduling and resource allocation algorithm without any constraints. The 2nd BTS will do the same.

When the request is granted, the 1st BTS treats the granted resources together from other neighbor BTSs as an input to its scheduler while the 2nd BTS should take into account of the resource already granted to the 1st BTS as a constraint to its scheduler.

When the request is neither accepted nor denied by a neighbor BTS, the 2nd BTS will send back a proposed resource grant plan that is based on the available resources determined by its scheduler or resource management entity to the 1st BTS. The 1st BTS can either decide to accept the new proposal or to re-negotiate, i.e. send a modified request with less resource requirements. In the case that the 1st BTS accepts the new proposal, the 1st BTS will acknowledge to the 2nd BTS. The 1st BTS then treats the granted resources together from other neighbor BTSs as an input to its scheduler while the 2nd BTS should take into account of the resource already granted to the 1st BTS as a constraint to its scheduler.

In all the cases, different scheduling and resource management algorithms can be applied to the 1st and the 2nd BTSs.

In this application, the techniques described can be applied to digital domain processing by processor and software, or processing using RF, analog or digital hardware. Whether it is specified or not, the above statement always applies.

The above embodiments described method of applying smart antenna technique in a coordinate way among a group of BTSs, such as Femtocells, to reduce interference or manage how interference happens to achieve performance enhancement such as higher system throughput or better QoS to individual applications.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), a text messaging system specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A method of wireless base station performance enhancement using coordinated beam forming in a wireless system having a plurality of wireless base stations having antenna systems capable of beam forming, the method comprising:
   identifying neighboring base stations using a receiver of at least one of the plurality of wireless base stations;
   determining characteristics of the neighboring base stations to be used to optimize capacity and coverage among two or more of the base stations; and
   configuring the antenna system of the two or more of the base stations based upon the determined characteristics to optimize capacity and coverage among the two or more of the base stations based on predetermined criteria by coordinating spatial resources among the two or more of the base stations, coordinating power resources among the two or more of the base stations, and coordinating other radio resources among the two or more of the base stations, wherein the predetermined criteria include one or more of pilot or reference signal strength, bit error rate or packet error rate, data throughput, required data rate, and quality of service requirements.

2. The method of claim 1 wherein coordinating other radio resources among the two or more of the base stations further comprises coordinating quality of service information among the two or more of the base stations.

3. The method of claim 1 wherein identifying neighboring base stations further comprises measuring signals received from the neighboring base stations to determine the direction and distance of one or more of the neighboring base stations.

4. The method of claim 1 wherein coordinating spatial resources among the two or more of the base stations includes coordinating different beam patterns among the two or more of the base stations and coordinating a codebook of patterns among the two or more of the base stations.

5. The method of claim 1, wherein configuring the antenna system of the two or more of the base stations to optimize capacity and coverage among the two or more of the base stations based on predetermined criteria further comprises coordinating transmission characteristics of the two or more of the base stations, and wherein transmission characteristics are selected from the group consisting of transmit power, time, frequency resources, and time-frequency resources.

6. The method of claim 1 wherein the determining characteristics of the system is coordinated by a central authority.

7. The method of claim 1 wherein the determining characteristics of the system is coordinated amongst the base stations in a distributed manner.

8. The method of claim 1 wherein each of the two or more base stations periodically configures its antenna system to remove a null beam.

9. The method of claim 1 wherein each of the two or more base stations periodically configures its antenna system to remove a null beam, and wherein the null beams of the two or more base stations include a common coverage area and the two or more base stations use the null beams in a time-division multiplexing manner.

10. The method of claim 1 further comprising using directional beam forming and coordinated measurement from the neighboring base stations to determine the direction and distance of the neighboring base stations.

11. The method of claim 1 wherein the determining characteristics of the system is coordinated by both a central authority and the base stations.

12. A method of wireless base station performance enhancement using coordinated beam forming in a wireless network having a plurality of wireless base stations having antenna systems capable of beam forming, the method comprising:
    identifying neighboring base stations using a receiver of at least one of the plurality of wireless base stations;
    determining characteristics of the neighboring base stations to be used to optimize capacity and coverage among two or more of the base stations; and
    configuring the antenna system of the two or more of the base stations to create a beam pattern to optimize capacity and coverage among the two or more of the base stations based on predetermined criteria by coordinating transmission characteristics of the two or more of the base stations, wherein transmission characteristics are selected from the group consisting of transmit power, time, frequency resources, and time-frequency resources.

13. The method of claim 12 wherein the beam pattern includes using frequency division in areas of common coverage for the two or more base stations.

14. The method of claim 12 wherein the beam pattern includes using time-frequency division in areas of common coverage for the two or more base stations.

15. The method of claim 12 wherein the antenna configurations are selected from a subset of configurations in a codebook of patterns to select patterns having stronger beam pattern in the direction of subscribers associated with the base station and weaker beam patterns in the direction of neighboring base stations.

16. The method of claim 15, wherein the codebook of patterns is for base station receiving or transmitting.

17. The method of claim 15 wherein the beam patterns include using time-frequency division in areas of common coverage for the two or more base stations.

18. The method of claim 12 wherein the antenna configurations are selected from a subset of configurations in a codebook of patterns to select patterns based on the direction of null beam patterns in the directions of neighboring base stations.

19. The method of claim 18, wherein the codebook of patterns is for base station receiving or transmitting.

20. The method of claim 12 wherein the antenna configurations are selected from a subset of configurations in a codebook of patterns subsets based on combination of the direction of stronger beam patterns and null beam patterns with the subsets of the codebook that have stronger beam pattern in the direction of subscribers associated with the base station and have null beam patterns in the direction of neighboring base stations being selected.

21. The method of claim 20, wherein the codebook of patterns is for base station receiving or transmitting.

22. The method of claim 12, wherein the beam pattern includes using adjustment of transmit power in areas of common coverage for the two or more base stations.

23. The method of claim 12, wherein the beam pattern includes using time division in areas of common coverage for the two or more base stations.

24. A base station for performance enhancement using coordinated beam forming in a wireless system, the base station comprising:
    a base station air-interface transceiver system which provides wireless communications with associated subscribers and which performs beam forming and includes an antenna system capable of beam forming;
    a first receiver configured to perform measurements of signals transmitted by other base stations;
    a control unit in communication with the base station air-interface transceiver system and the first receiver for sending instructions to the base station air-interface transceiver system for configuring the antenna system of the base station air-interface transceiver system based upon characteristics of one or more neighboring base stations to optimize capacity and coverage among the system of base stations based on predetermined criteria by coordinating transmission characteristics of the antenna system, wherein transmission characteristics are selected from the group consisting of transmit power, time, frequency resources, and time-frequency resources.

25. The base station of claim 24, wherein the antenna configurations are selected from a subset of configurations in a codebook of patterns.

26. A method of wireless base station performance enhancement using coordinated beam forming in a wireless network having a plurality of wireless base stations having antenna systems capable of beam forming and associated subscribers, the method comprising:
identifying neighboring base stations using a receiver of at least one of the plurality of wireless base stations;
determining characteristics of the neighboring base stations to be used to optimize capacity and coverage among two or more of the base stations; and
configuring the antenna system of the two or more of the base stations to antenna configurations which create a beam pattern with reduced interference with one or more neighboring base stations, the beam patterns being selected from a subset of patterns in a codebook of patterns.

27. The method of claim 26, further comprising partitioning the codebook into two or more subsets based on the directional region of stronger beam patterns and choosing the subsets of the codebook for a base station that has a stronger beam pattern in the direction of the associated subscribers of that base station and avoiding using the subsets that have stronger beam patterns in the direction of neighboring base stations.

28. The method of claim 26, further comprising partitioning the codebook into two or more subsets based upon selected directional regions and grouping those patterns with strong beam patterns in each directional region.

29. The method of claim 26, further comprising partitioning the codebook into two or more subsets based on a combination of the direction of stronger beam patterns and null beam patterns and choosing the subsets of the codebook for a base station that has stronger beam patterns in the direction of the associated subscribers and has null beam patterns in the direction of neighboring base stations.

30. The method of claim 26, further comprising coordinating transmission characteristics of the two or more of the base stations.

31. The method of claim 30, wherein transmission characteristics are selected from the group consisting of transmit power, time, frequency resources, time-frequency resources.

* * * * *